(12) United States Patent
Miyatake et al.

(10) Patent No.: US 6,339,127 B1
(45) Date of Patent: Jan. 15, 2002

(54) AQUEOUS EMULSION CONTAINING SILICONE RUBBER PARTICLES AND PROCESS FOR PREPARING THE SAME

(75) Inventors: Nobuo Miyatake; Kazunori Takikawa, both of Takasago; Shigeki Hamaguchi, Takarazuka, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/402,824

(22) PCT Filed: Feb. 10, 1999

(86) PCT No.: PCT/JP99/00574

§ 371 Date: Oct. 12, 1999

§ 102(e) Date: Oct. 12, 1999

(87) PCT Pub. No.: WO99/41315

PCT Pub. Date: Aug. 19, 1999

(30) Foreign Application Priority Data

Feb. 13, 1998 (JP) .......................................... 10-031599

(51) Int. Cl.$^7$ .............................................. C08L 83/10
(52) U.S. Cl. ..................... 525/106; 525/100; 525/479; 525/63; 524/837
(58) Field of Search ................. 525/100, 106, 525/479, 63; 528/25; 524/837, 858

(56) References Cited

U.S. PATENT DOCUMENTS 5,385,975 A * 1/1995 Nakamura et al.

FOREIGN PATENT DOCUMENTS

| EP | 0 791 617 A1 | 8/1997 |
| JP | 62-141029 | 6/1987 |
| JP | 5-194740 | 8/1993 |
| JP | 5-209149 | 8/1993 |
| JP | 403045628 | * 2/1997 |
| JP | 409052954 | * 2/1997 |
| JP | 11148009 | * 6/1999 |

* cited by examiner

Primary Examiner—Robert Dawson
Assistant Examiner—Marc S. Zimmer
(74) Attorney, Agent, or Firm—Armstrong, Westerman, Hattori, McLeland & Naughton, LLP

(57) ABSTRACT

A silicone rubber particle-containing aqueous emulsion which comprises polymer particles comprising (A) 0.1 to 45% by weight of a vinyl homopolymer or copolymer and (B) 55 to 99.9% by weight of a silicone rubber, wherein the polymer particles have a number average particle size of 0.008 to 0.1 μm and a variation coefficient in particle size distribution of at most 65%, and the emulsion contains at most 10 parts by weight of an emulsifier per 100 parts by weight of the silicone rubber (B); and a silicone rubber-based graft copolymer particle-containing aqueous emulsion obtained by graft-polymerizing a vinyl monomer in the presence of the polymer particles. These emulsions effectively exhibit the properties of silicone rubber without causing any problem such as coloration owing to an emulsifier since the number average particle size is small and the particle size distribution is narrow and since the amount of the emulsifier contained therein is small, and are useful as impact modifier, softener, fiber treating agent, hair treating agent, slipping agent, water repellent, processing aid for molding materials, flame retardant, coating material and the like.

11 Claims, No Drawings

AQUEOUS EMULSION CONTAINING SILICONE RUBBER PARTICLES AND PROCESS FOR PREPARING THE SAME

TECHNICAL FIELD

The present invention relates to an aqueous emulsion containing silicone rubber particles which has a number average particle size of at most 0.1 μm and a narrow particle size distribution, and which is suitable for use in impact modifier, softener, fiber treating agent, hair treating agent, slipping agent, water repellent, processing aid for molding materials, flame retardant, coating material and the like, and also to a process for the preparation of the aqueous emulsion.

BACKGROUND ART

Silicone rubbers have good properties such as elasticity, water resistance, thermal stability, weatherability, flame resistance and lubricity and, therefore, aqueous emulsions containing them have been widely used in impact modifier, softener, fiber treating agent, hair treating agent, slipping agent, water repellent, processing aid for molding materials, flame retardant, coating material and the like. In these uses, it is effective in exhibiting higher performances to adjust the number average particle size of the aqueous emulsions of silicone rubber particles to not more than 0.1 μm and to make the particle size distribution of the emulsions narrow. Some proposals to obtain such aqueous emulsions of silicone rubber particles have been made, but satisfactory emulsions have not yet been obtained.

Japanese Patent Publication Kokai No. 62-141029 discloses a process for preparing an aqueous emulsion containing silicone rubber particles having a particle size of at most 0.1 μm which comprises adding an emulsion composed of an organosiloxane, an emulsifier and water to a reaction system containing water and a polymerization catalyst and carrying out the polymerization.

Japanese Patent Publication Kokai No. 5-194740 discloses a process for preparing an aqueous emulsion containing silicone rubber particles having a particle size of at most 0.1 μm which comprises adding dropwise an emulsion composed of a mixture of an organosiloxane, a siloxane-based crosslinking agent and a siloxane-based graftlinking agent, an emulsifier and water to a reaction system containing water and a polymerization catalyst, while carrying out the polymerization.

However, in both processes disclosed in Japanese Patent Publications Kokai No. 62-141029 and Kokai No. 5-194740, at least 13 parts by weight of an emulsifier is required per 100 parts by weight of the silicone rubber in the aqueous silicone rubber emulsion when it is desired to adjust the particle size of the emulsion to not more than 0.1 μm and to make the particle size distribution narrow, for example, to adjust the variation coefficient (standard deviation/average particle size (%)) which is a measure of the particle size distribution to not more than 65%. Thus, in case of using aqueous silicone rubber emulsions obtained by such conventional processes as impact modifier, slipping agent or flame retardant, there arises a problem that molded articles are easy to be colored. Also, in case of using them as coating material or fiber treating agent, there arises a problem that the water repellency is deteriorated.

Thus, it is an object of the present invention to provide an aqueous emulsion of silicone rubber particles having a number average particle size of at most 0.1 μm and a narrow particle size distribution (variation coefficient of at most 65%) which has a small content of an emulsifier.

A further object of the present invention is to provide a process for preparing an aqueous emulsion of silicone rubber particles according to which an aqueous emulsion of silicone rubber particles having a number average particle size of at most 0.1 μm and a narrow particle size distribution can be prepared with use of a small amount of an emulsifier.

Another object of the present invention is to provide an aqueous emulsion containing silicone rubber-based graft copolymer particles, which is prepared from silicone rubber particles having a number average particle size of at most 0.1 μm and a narrow particle size distribution.

Still another object of the present invention is to provide a resin composition wherein such silicone rubber particles and/or graft copolymer particles are incorporated into a thermoplastic resin.

DISCLOSURE OF THE INVENTION

The present inventors have found, as a result of making an intensive study in view of the problems mentioned above, that an aqueous emulsion containing silicone rubber particles having a number average particle size of 0.008 to 0.1 μm and a variation coefficient in particle size distribution of at most 65% is obtained with use of a small amount of an emulsifier, while maintaining properties of conventional aqueous emulsions containing silicone rubber particles, by polymerizing silicone rubber-forming components in an aqueous emulsion of a vinyl polymer or copolymer, and that an aqueous emulsion of silicone rubber-based graft copolymer particles wherein a vinyl polymer is grafted onto silicone rubber-containing polymer particles having a small number average particle size and a small variation coefficient of the particle size distribution is obtained by polymerizing a vinyl monomer in the above-mentioned aqueous emulsion containing silicone rubber particles.

Thus, the present invention provides a silicone rubber particle-containing aqueous emulsion which contains polymer particles comprising (A) 0.1 to 45% by weight of a vinyl homopolymer or copolymer and (B) 55 to 99.9% by weight of a silicone rubber, wherein said polymer particles have a number average particle size of 0.008 to 0.1 μm and a variation coefficient in particle size distribution of at most 65%, and said emulsion contains at most 10 parts by weight of an emulsifier per 100 parts by weight of said silicone rubber (B).

The silicone rubber particle-containing aqueous emulsion is prepared by adding (b) 60 to 99.9 parts by weight of a silicone rubber-forming component comprising 50 to 100% by weight of a mixture of an organosiloxane and a difunctional silane compound, 0 to 50% by weight of a silane compound having a functionality of at least 3 and 0 to 50% by weight of a polymerizable vinyl group-containing silane compound to an aqueous emulsion containing the vinyl homopolymer or copolymer (A) obtained by emulsion-polymerizing (a) 0.1 to 40 parts by weight of at least one vinyl monomer selected from the group consisting of an aromatic vinyl monomer, a vinyl cyanide monomer, a halogen-containing vinyl monomer, a (meth)acrylic ester monomer, a carboxyl group-containing vinyl monomer and a conjugated diene monomer so that the total amount of the vinyl monomer (a) and the silicone rubber-forming component (b) is 100 parts by weight, and polymerizing the silicone rubber-forming component (b). The silicone rubber particles are obtained by coagulating the silicone rubber particle-containing aqueous emulsion followed by dehydration and drying.

The present invention also provides an aqueous emulsion containing silicone rubber-based graft copolymer particles, which is prepared by polymerizing a vinyl monomer (c) in an aqueous emulsion containing the above-mentioned silicone rubber particle-containing aqueous emulsion. The graft copolymer particles are obtained by coagulating the graft copolymer particle-containing aqueous emulsion followed by dehydration and drying.

These aqueous emulsion of silicone rubber and aqueous emulsion of silicone rubber-based graft copolymer have a small average particle size, a narrow particle size distribution and a low content of an emulsifier. Therefore, they efficiently exhibit desirable properties without causing problems owing to an emulsifier and are very useful for various purposes, for example, as impact modifier, softener, fiber treating agent, hair treating agent, slipping agent, water repellent, processing aid for molding materials, flame retardant, coating material, and the like.

Thus, the present invention further provides a thermoplastic resin composition comprising a thermoplastic resin and the silicone rubber particles and/or silicone rubber-based graft copolymer particles as mentioned above. The thermoplastic resin composition of the present invention has excellent properties such as impact resistance, processability, appearance of molded articles, slippability and flame resistance.

The term "vinyl" as used herein indicates a concept including polymerizable C=C bonds such as vinyl and vinylidene, and also encompasses C=C bonds as included in conjugated diene compounds.

BEST MODE FOR CARRYING OUT THE INVENTION

The aqueous silicone rubber emulsion of the present invention is an aqueous emulsion containing polymer particles comprising (A) 0.1 to 45% by weight of a vinyl homopolymer or copolymer and (B) 55 to 99.9% by weight of a silicone rubber. The polymer particles comprising vinyl homopolymer or copolymer and the silicone rubber include, for instance, polymer particles obtained by polymerizing a component capable of forming the silicone rubber (B) (silicone rubber-forming component (b)) in the presence of particles of the vinyl homo- or copolymer (A); polymer particles obtained by polymerizing a component capable of forming the vinyl homo- or copolymer (A) (vinyl monomer (a)) in the presence of particles of the silicone rubber (B); polymer particles obtained by, using an emulsion containing both the vinyl monomer (a) and the silicone rubber-forming component (b), firstly polymerizing either one of the vinyl monomer (a) and the silicone rubber-forming component (b) and then conducting the polymerization of the rest. Of these, preferred are the polymer particles obtained by polymerizing the silicone rubber-forming component (b) in the presence of the vinyl homo- or copolymer particles (A), and the polymer particles obtained by, in an emulsion containing both the vinyl monomer (a) and the silicone rubber-forming component (b), firstly polymerizing the vinyl monomer (a) and then conducting the polymerization of the silicone rubber-forming component (b). In particular, the polymer particles obtained by polymerizing the silicone rubber-forming component (b) in the presence of the vinyl homo- or copolymer particles (A) are preferred from the viewpoint of a good stability of the obtained aqueous emulsion containing the silicone rubber particles, though the reason of good stability is unknown.

It is preferable that the particles of vinyl homo- or copolymer (A) used in the preparation of the polymer particles by the polymerization of the silicone rubber-forming component (b) in the presence of the vinyl homo- or copolymer particles (A) are comprised of a vinyl homo- or copolymer whose toluene-insoluble fraction is from 0 to 90% by weight, especially 0 to 30% by weight, more especially 0% by weight, as measured by immersing in toluene at room temperature for 24 hours and whose solvent-soluble portion has a number average molecular weight of 500 to 5,000,000, especially 1,000 to 1,000,000, in terms of polystyrene, and have a number average particle size of 0.005 to 0.09 $\mu$m, especially 0.005 to 0.07 $\mu$m, and a variation coefficient in particle size distribution of 10 to 65%, especially 20 to 50%. If the content of the toluene-insoluble portion becomes large, the number average particle size of the obtained aqueous silicone rubber emulsion tends to become large. If the number average molecular weight mentioned above is too small or too large, the number average particle size of the obtained aqueous silicone rubber emulsion tends to become large. Also, particles having a too small number average particle size are themselves difficult to obtain, and if the number average particle size is too large, the number average particle size of the obtained aqueous silicone rubber emulsion tends to exceed 0.1 $\mu$m. Further, particles having a too small variation coefficient in particle size distribution are themselves difficult to obtain, and if the variation coefficient is too large, the particle size distribution of the obtained aqueous silicone rubber emulsion tends to wide.

Examples of the monomer used in the preparation of the vinyl homo- or copolymer (A) are, for instance, an aromatic vinyl monomer such as styrene, $\alpha$-methylstyrene, p-methylstyrene or p-butylstyrene; a vinyl cyanide monomer such as acrylonitrile or methacrylonitrile; a halogenated vinyl monomer such as vinyl chloride, vinylidene chloride or vinylidene fluoride; (meth)acrylic ester monomer such as methyl acrylate, ethyl acrylate, propyl acrylate, butyl acrylate, 2-ethylhexyl acrylate, glycidyl acrylate, hydroxyethyl acrylate, methyl methacrylate, ethyl methacrylate, butyl methacrylate, lauryl methacrylate, glycidyl methacrylate or hydroxyethyl methacrylate; a carboxyl group-containing vinyl monomer such as itaconic acid, (meth) acrylic acid, fumaric acid or maleic acid; a conjugated diene monomer such as butadiene, chloroprene or isoprene; and the like. These may be used alone or in admixture thereof. Of these, a monomer containing 20 to 100% by weight, especially 30 to 100% by weight, of any of butyl acrylate, 2-ethylhexyl acrylate, butyl methacrylate, butadiene and acrylonitrile is preferred from the viewpoints that the stability of the obtained aqueous silicone rubber emulsion is high and the particle size thereof is easy to become small. Also, styrene, (meth)acrylic acid and the like are preferred as a comonomer therefor.

Also, a compound having at least two polymerizable vinyl groups in its molecule and/or a polymerizable vinyl group-containing silane compound may be used in an amount of at most 10 parts by weight per 100 parts by weight of the monomer used in the preparation of the vinyl homo- or copolymer.

The compound having at least two polymerizable vinyl groups in its molecule is a crosslinking agent which imparts a crosslinked structure to the vinyl homo- or copolymer (A), and includes, for instance, divinyl benzene, allyl methacrylate, triallyl cyanurate and other known crosslinking agents. Also, the polymerizable vinyl group-containing silane compound serves as a graftlinking agent to provide the side chains and/or molecular ends of the vinyl homo- or copolymer (A) with grafting sites which react with the silicone rubber-forming component (b). As the silane compound are used, for instance, those used in the silicone rubber-forming component (b) as described after in detail. Since the number average particle size of the obtained aqueous silicone rubber emulsion tends to increase if the crosslinking agent and/or the graftlinking agent are used, it is preferable not to use them when a sufficiently small average particle size is desired.

Examples of the vinyl homo- or copolymer (A) are, for instance, polybutyl acrylate, butyl acrylate-styrene copolymer, butyl acrylate-methyl methacrylate copolymer, butyl acrylate-butyl methacrylate copolymer, butyl acrylate-2-ethylhexyl acrylate copolymer, butyl acrylate-methacrylic acid-butyl methacrylate copolymer, polybutyl methacrylate, polystyrene, styrene-acrylonitrile copolymer, styrene- butadiene copolymer, polybutadiene, butadiene-butyl acrylate copolymer, polyvinyl chloride, polyvinylidene fluoride, and the like. The polymer (A) may be crosslinked polymers or may be non-crosslinked polymers, but non-crosslinked polymers are preferred since the particle size of the obtained aqueous silicone rubber emulsion becomes smaller. The term "copolymer" as herein used includes random copolymers, block copolymers, graft copolymers and those prepared by a combination of these polymerization methods and is not particularly limited.

The silicone rubber (B) obtained by polymerizing the silicone rubber-forming component (b) in the presence of the vinyl homo- or copolymer (A) exhibits performances such as softness brought about by silicone. The silicone rubber (B) formed by the polymerization of the silicone rubber-forming component (b) may chemically bond with the vinyl polymer (A) to form a single particle, or may form a single particle in the state of being physically mixed with the vinyl polymer (A). Further, the silicone rubber (B) may form a single particle with the vinyl polymer (A) in the state that a part of the rubber (B) chemically bond with the vinyl polymer (A) and a part of the rubber (B) is physically mixed with the vinyl polymer (A), or the emulsion particles may be a mixture of at least two of the above single particles. Also, the silicone rubber (B) may form a silicone rubber particle independently with a vinyl polymer particle (A) without chemically bonding and being physically mixed with the vinyl polymer (A).

The silicone rubber-forming component (b) is a component for forming the silicone rubber (B) through siloxane bonds from an organosiloxane and optionally a silane compound such as a difunctional silane compound, a silane compound having a functinality of at least 3 or a polymerizable vinyl group-containing silane compound. When the silicone rubber-forming component (b) contains a polyfunctional silane compound having a functionality of at least 3 or a polymerizable vinyl group-containing silane compound, crosslinked silicone rubbers (B) are obtained. Also, when the component (b) contains a polymerizable vinyl group-containing silane compound, it provides a grafting site for vinyl monomer (c) described after.

The organosiloxane and the difunctional silane compound constitute the main backbone of the silicone rubber (B). Examples of the organosiloxane are, for instance, a cyclic siloxane such as hexamethylcyclotrisiloxane, octamethylcyclotetrasiloxane, decamethylcyclopentasiloxane, dodecamethylcyclohexasiloxane or trimethyltriphenylcyclosiloxane, a linear organosiloxane oligomer, and the like. Examples of the difunctional silane compound are, for instance, diethoxydimethylsilane, dimethoxydimethylsilane, diphenyldimethoxysilane, diphenyldiethoxysilane, N-(2-aminoethyl)-3-aminopropylmethyldimethoxysilane, 3-aminopropylmethyldimethoxysilane, 4-aminobutylmethyldimethoxlysilane, 3-chloropropylmethyldimethoxysilane, 3-glycidoxypropylmethyldimethoxysilane, heptadecafluorodecylmethyldimethoxysilane, trifluoropropylmethyldimethoxysilane, octadecylmethyldimethoxysilane, and the like. Among these combinations of organosiloxane and difunctional silane compound, octamethylcyclotetrasiloxne and mixtures of at least two cyclic siloxanes are preferred from an economical point of view.

The silane compound having a functionality of at least 3 is used as a component for introducing a crosslinked structure by copolymerizing with the organosiloxane and difunctional silane compound, thereby imparting a rubber elasticity to the silicone rubber (B), namely as a crosslinking agent for the silicone rubber. Examples thereof are, for instance, tetrafunctional and trifunctional alkoxysilane compounds such as tetraethoxysilane, methyltriethoxysilane, methyltrimethoxysilane, ethyltriethoxysilane, N-(2-aminoethyl)-3-aminopropyltrimethoxysilane, 3-aminopropyltrimethoxysilane, 4-aminobutyltrimethoxysilane, 3-chloropropyltrimethoxysilane, 3-gycidoxypropyltrimethoxysilane, heptadecafluorodecyltrimethoxysilane, trifluoropropyltrimethoxysilane and octadecyltrimethoxysilane, and others. Of these, tetraethoxysilane is preferred from the viewpoint of a high crosslinking efficiency.

The polymerizable vinyl group-containing silane compound is a component for introducing polymerizable vinyl groups into the side chains or molecular chain ends by copolymerizing with the organosiloxane, difunctional silane compound or silane compound having a functionality of at least 3. The polymerizable vinyl group serves as a graftactive point upon chemically bonding with a vinyl homo- or copolymer formed from vinyl monomer (c) mentioned after. Further, since crosslinkages can be formed by causing a radical reaction between the graft-active points through a radical polymerization initiator as described after, the polymerizable vinyl group-containing silane compound can be used as a crosslinking agent.

Examples of the polymerizable vinyl group-containing silane compound are, for instance, a silane comound of the formula (I):

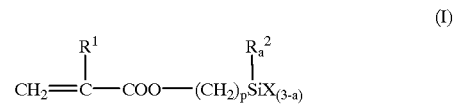

(I)

wherein $R^1$ is hydrogen atom or methyl group, $R^2$ is a monovalent hydrocarbon group having 1 to 6 carbon atoms, X is an alkoxyl group having 1 to 6 carbon atoms, a is 0, 1 or 2, and p is an integer of 1 to 6, a silane compound of the formula (II):

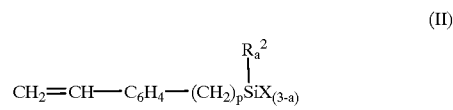

(II)

wherein $R^2$, X, a and p are as defined above, a silane compound of the formula (III):

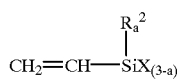

(III)

wherein $R^2$, X, a and p are as defined above,
a silane compound of the formula (IV):

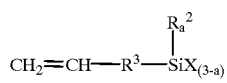

(IV)

wherein $R^2$, X, a and p are as defined above, and $R^3$ is a bivalent hydrocarbon group having 1 to 6 carbon atoms,
a silane compound of the formula (V):

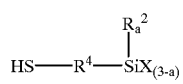

(V)

wherein $R^2$, X, a and p are as defined above, and $R^4$ is a bivalent hydrocarbon group having 1 to 18 carbon atoms, and the like.

Examples of the group $R^2$ in the formulas (I) to (V) are, for instance, an alkyl group such as methyl group, ethyl group or propyl group, phenyl group, and the like. Examples of the group X are, for instance, methoxy group, ethoxy group, propoxy group and butoxy group and the like. Examples of the group $R^3$ in the formula (IV) are, for instance, methylene group, ethylene group, propylene group butylene group and the like. Examples of the group $R^4$ in the formula (V) are, for instance, methylene group, ethylene group, propylene group butylene group and the like.

Examples of the silane compound (I) are, for instance, β-methacryloyloxyethyldimethoxymethylsilane, γ-methacryloyloxypropyldimethoxymethylsilane, γ-methacryloyloxypropyltrimethoxysilane, γ-methacryloyloxypropyldimethylmethoxysilane, γ-methacryloyloxypropyltriethoxysilane, γ-methacryloyloxypropyldiethoxymethylsilane, γ-methacryloyloxypropyltripropoxysilane, γ-methacryloyloxypropyldipropoxymethylsilane, γ-acryloyloxypropyltrimethoxysilane, and the like. Examples of the silane compound (II) are, for instance, p-vinylphenyldimethoxymethylsilane, p-vinylphenyltrimethoxysilane, p-vinylphenyltriethoxysilane, p-vinylphenyldiethoxymethylsilane, and the like. Examples of the silane compound (III) are, for instance, vinylmethyldimethoxysilane, vinylmethyldiethoxysilane, vinyltrimethoxysilane, vinyltriethoxysilane, and the like. Examples of the silane compound (IV) are, for instance, allylmethyldimethoxysilane, allylmethyldiethoxysilane, allyltrimethoxysilane, allyltriethoxysilane, and the like. Examples of the silane compound (V) are, for instance, mercaptopropyltrimethoxysilane, mercaptopropyldimethoxymethylsilane, and the like. Of these, silane compounds of the formulas (I), (II) and (V) are preferably used from the viewpoints of economy and high reactivity.

In case that the above-mentioned polymerizable vinyl group-containing silane compounds are of trialkoxysilane type, they also serve as a crosslinking agent.

With respect to the proportions of the organosiloxane, the difunctional silane compound, the silane compound having a functionality of at least 3 and the polymerizable vinyl group-containing silane compound in the silicone rubber-forming component (b) in the polymerization thereof, it is preferable that the proportion of the total of the organosiloxane and the difunctional silane compound is from 50 to 100% by weight, especially 70 to 100% by weight, more especially 90 to 100% by weight, wherein the ratio of the organosiloxane to the difunctional silane compound is from 100/0 to 50/50 by weight, especially 100/0 to 70/30 by weight, the proportion of the silane compound having a functionality of at least 3 is from 0 to 50% by weight, especially 0 to 30% by weight, more especially 0 to 10% by weight, and the proportion of the the polymerizable vinyl group-containing silane compound is from 0 to 50% by weight, especially 0 to 30% by weight, more especially 0 to 10% by weight.

If the proportion of the total of organosiloxane and difunctional silane compound is less than 50% by weight, the obtained silicone rubber (B) tends to exhibit the properties such as softness with difficulty. The silane compound having a functionality of at least 3 and the polymerizable vinyl group-containing silane compound are optional components. If the proportion of each of these components exceeds 50% by weight, the properties of the silicone rubber are hard to be exhibited. For obtaining effects produced by the use of the silane compound having a functionality of at least 3 or the polymerizable vinyl group-containing silane compound, it is desirable to use each of them in an amount of at least 0.5% by weight.

It is preferable that the toluene-insoluble fraction of polymer particles obtained by polymerizing the silicone rubber-forming component (b) in the presence of particles of the vinyl homo- or copolymer (A) as measured by immersing the polymer particles in toluene for 24 hours is from 0 to 95% by weight, especially from 0 to 90% by weight. If the toluene-insoluble fraction is too large, properties as a rubber tend to be exhibited with difficulty.

The polymer particles obtained by preparing an emulsion containing both the vinyl monomer (a) and the silicone rubber-forming component (b), firstly polymerizing the vinyl monomer (a) and then polymerizing the silicone rubber-forming component (b) tend to have a larger particle size than the above-mentioned polymer particles obtained by adding the component (b) to and polymerizing it in an emulsion of the vinyl polymer (A). The same vinyl monomers as those used in the preparation of the vinyl homo- or copolymer (A) can be used as the vinyl monomer (a) in this method. Also, the proportions of the vinyl monomer (a) and the respective components of the silicone rubber-forming component (b) are the same as in the above-mentioned preparation of the polymer particles by polymerizing the silicone rubber-forming component (b) in the presence of the particles of vinyl homo- or copolymer (A).

It is preferable that the toluene-insoluble fraction of polymer particles obtained by preparing an emulsion containing both the vinyl monomer (a) and the silicone rubber-forming component (b), firstly polymerizing the vinyl monomer (a) and then polymerizing the silicone rubber-forming component (b), as measured by immersing the polymer particles in toluene for 24 hours is from 0 to 95% by weight, especially from 0 to 90% by weight. If the toluene-insoluble fraction is too large, properties as a rubber tend to be exhibited with difficulty.

The proportions of polymer components in the particles of the aqueous silicone rubber particle-containing emulsion of the present invention are from 0.1 to 45% by weight, preferably 0.6 to 35% by weight, more preferably 1 to 12% by weight, for the vinyl homo- or copolymer (A), and from 55 to 99.9% by weight, preferably 65 to 99.4% by weight, more preferably 88 to 99% by weight, for the silicone rubber (B). If the proportion of the vinyl homo- or copolymer (A) in the particles is less than 0.1% by weight, namely if the proportion of the silicone rubber (B) is more than 99.9% by weight, the particle size of the aqueous silicone rubber particle-containing emulsion tends to become large. If the proportion of the vinyl homo- or copolymer (A) in the particles is more than 45% by weight, namely if the proportion of the silicone rubber (B) is less than 55% by weight, the properties of silicone rubber tend to be exhibited with difficulty.

The number average particle size of the aqueous silicone rubber particle-containing emulsion of the present invention is from 0.008 to 0.1 $\mu$m, preferably 0.008 to 0.06 $\mu$m, more preferably 0.008 to 0.04 $\mu$m. It is difficult to obtain an emulsion having a number average particle size of less than 0.008 $\mu$m, and if the number average particle size is more than 0.1 $\mu$m, an impact resistance-imparting effect as expected when used as an impact modifier tends to be lowered.

Also, the variation coefficient in particle size distribution of the number average particle size is from 10 to 65%, preferably 20 to 55%, more preferably 20 to 50%. It is difficult to obtain the particles having a variation coefficient of less than 10%. If the variation coefficient is more than 65%, an impact resistance-imparting effect as expected when used as an impact modifier tends to be lowered.

The amount of an emulsifier included in the aqueous silicone rubber particle-containing emulsion of the present invention is at most 10 parts by weight, preferably from 0.5 to 8 parts by weight, more preferably from 1.5 to 6 parts by weight, per 100 parts by weight of the silicone rubber (B). If the amount of the emulsifier is more than 10 parts by weight, the appearance of resins is deteriorated, for example, when the emulsion is used as an impact modifier or slipping agent for thermoplastic resins. If the amount of the emulsifier is less than 0.5 part by weight, the stability of the emulsion tends to be decreased.

Preferably, the solid content of the aqueous silicone rubber particle-containing emulsion of the present invention is from 10 to 50% by weight, especially 15 to 40% by weight. If the solid content is less than 10% by weight, a large amount of the emulsion must be used, for example, when used as an impact modifier, since the concentration of the effective component is small, thus the productivity is lowered. If the solid content is more than 50% by weight, the stability of the emulsion tends to be decreased.

An explanation is given below with respect to a process for preparing the aqueous silicone rubber particle-containing emulsion of the present invention.

The preparation of the aqueous emulsion containing the polymer particles obtained by polymerizing silicone rubber-forming component (b) in the presence of the particles of vinyl homo- or copolymer (A) is carried out, for example, in the following manner.

Preferably, to an aqueous emulsion of vinyl homo- or copolymer (A) obtained by emulsion-polymerizing 0.1 to 40 parts by weight, especially 0.5 to 30 parts by weight, more especially 1 to 10 parts by weight, of at least one member selected, as a component for preparing the vinyl homo- or copolymer (A) (vinyl monomer (a)), from the group consisting of an aromatic vinyl monomer, a vinyl cyanide monomer, a halogenated vinyl monomer, a (meth)acrylic ester monomer, a carboxyl group-containing vinyl monomer and a conjugated diene monomer, there is added an aqueous emulsion containing 60 to 99.9 parts by weight, especially 80 to 99.5% by weight, more especially 90 to 99% by weight, of a silicone rubber-forming component (b) comprising 50 to 100% by weight, especially 70 to 100% by weight, more especially 90 to 100% by weight, of the total of an organosiloxane and a difunctional silane compound, 0 to 50% by weight, especially 0 to 30% by weight, more especially 0 to 10% by weight, of a silane compound having a functionality of at least 3, and 0 to 50% by weight, especially 0 to 30% by weight, more especially 0 to 10% by weight, of a polymeriable vinyl group-containing silane compound, so that the total amount of the components (a) and (b) becomes 100 parts by weight, followed by the polymerization of the component (b) to form a silicone rubber (B).

The aqueous emulsion of the vinyl homo- or copolymer (A) is obtained by polymerizing the vinyl monomer (a) by a usual emulsion polymrization method, for example, by a method as disclosed in Japanese Patent Publication Kokai No. 50-88169 or No. 61-1417469.

The number average particle size of the aqueous emulsion of the vinyl homo- or copolymer (A) is preferably, as described above, from 0.005 to 0.09 $\mu$m, especially 0.005 to 0.07 $\mu$m, and the variation coefficient in the particle size distribution is preferably from 10 to 65%, especially 20 to 50%.

The emulsion having a particle size within the range as mentioned above is readily obtained by adjusting the amount of an emulsifier used in the emulsion polymerization of the vinyl monomer (a) (hereinafter referred to as "emulsifier ($\alpha$)").

Preferably, the amount of the emulsifier ($\alpha$) is from 0.001 to 7.95 parts by weight, especially 0.01 to 7 parts by weight, more especially 0.1 to 5 parts by weight, per 100 parts by weight of the silicone rubber-forming component (b). If the amount is less than 0.001 part by weight, the number average particle size of the aqueous emulsion of vinyl homo- or copolymer (A) becomes larger than 0.09 $\mu$m, and the number average particle size of the obtained aqueus silicone rubber emulsion tends to exceed 0.1 $\mu$m. On the other hand, if the amount is more than 7.95 parts by weight, the total amount of the emulsifier ($\alpha$) and an emulsifier used in the polymerization of the silicone rubber-forming component (b) will exceed 8 parts by weight. Thus, since the polymerization conversion of the silicone rubber-forming component (b) is usually 80% by weight or more, the amount of the emulsifier in the aqueous silicone rubber particle-containing emulsion will become 10 parts by weight or more per 100 parts by weight of the silicone rubber, so the appearance of resins tends to be deteriorated when used, for example, as an impact modifier.

Preferably, the amount of the emulsifier ($\alpha$) is also from 0.0015 to 7950 parts by weight, especially 0.015 to 7000 parts by weight, per 100 parts by weight of the vinyl monomer (a). If the amount is less than 0.0015 part by weight, the number average particle size of the aqueous silicone rubber particle-containing emulsion tends to exceed 0.1 $\mu$m, and if the amount is more than 7950 parts by weight, the appearance of resins tends to be deteriorated when used, for example, as an impact modifier.

Emulsifiers which have been used in usual emulsion polymerization are used as the emulsifier ($\alpha$) without any particular restriction. Examples of the emulsifier ($\alpha$) are, for instance, an anionic surfactant such as sodium oleate, potassium oleate, sodium palmitate, potassium palmitate, sodium salt of rosin, potassium salt of rosin, alkylbenzenesulfonic acid, sodium alkylbenzenesulfonate, alkylsulfonic acid, sodium alkylsulfonate, sodium (di)alkyl sulfosuccinate, sodium polyoxyethylene nonylphenyl ether sulfonate or sodium alkylsulfate; a non-ionic surfactant such as polyoxyethylene nonylphenyl ether or polyoxyethylene lauryl ether; a cationic surfactant such as benzylmethyldodecyl ammonium hydroxide, octyltrimethyl ammonium chloride, dodecyltrimethyl ammonium chloride or hexadecyltrimethyl ammonium chloride; and the like. The emulsifiers may be used alone or in admixture thereof. From the viewpoint of a high stability of emulsion, preferred are sodium alkylbenzenesulfonate, sodium alkylsulfonate, sodium (di) alkyl sulfosuccinate, sodium alkylsulfate and benzylmethyldodecyl ammonium hydroxide.

Also, the amount of the vinyl monomer (a) is from 0.1 to 40 parts by weight, especially 0.5 to 30 parts by weight, more especially 1 to 10 parts by weight, based on 100 parts by weight of the total of the vinyl monomer (a) and the silicone rubber-forming component (b). If the amount of the vinyl monomer (a) is less than 0.1 part by weight, the particle size of the obtained aqueous silicone rubber emulsion tends to become large, and if the amount is more than 40 parts by weight, the polymerization conversion of the silicone rubber-forming component (b) tends to decrease.

The radical reaction in the polymerization can be conducted without particular restriction so long as usual radical polymerization is adopted, e.g., a method wherein a polymerization is proceeded by thermally decomposing a radical initiator, or a redox polymerization using a reducing agent.

Examples of the radical initiator are an organic peroxide such as cumene hydroperoxide, tert-butyl hydroperoxide, benzoyl peroxide, tert-butylperoxy isopropylcarbonate, di-tert-butyl peroxide, tert-butylperoxy laurate or lauroyl peroxide; an inorganic peroxide such as potassium persulfate or ammonium persulfate; an azo compound such as 2,2'-azobisisobutylonitrile or 2,2'-azobis-2,4-dimethylvaleronitrile; and the like. Of these, organic peroxides and inorganic peroxides are preferably used from the viewpoint of a high reactivity.

Examples of the reducing agent used in the redox system are a mixture of ferrous sulfate/glucose/sodium pyrophosphate, a mixture of ferrous sulfate/dextrose/sodium pyrophosphate, a mixture of ferrous sulfate/sodium formaldehyde sulfoxylate/ethylenediamineacetate, and the like.

The radical polymerization initiator is used usually in an amount of 0.005 to 20 parts by weight, especially 0.01 to 10 parts by weight, more especially 0.03 to 5 parts by weight, per 100 parts by weight of the vinyl monomer (a) used. If the amount of the initiator is less than 0.005 part by weight, the polymerization velocity is low, so the production efficiency tends to be lowered, and if the amount is more than 20 parts by weight, heat generation during the polymerization becomes large, so the production tends to become difficult.

A chain transfer agent may also be used upon the radical reaction, as occasion demands. The chain transfer agent is not particularly limited, and any of chain transfer agents used in a usual emulsion polymerization can be used. Examples of the chain transfer agent are, for instance, t-dodecylmercaptan, n-octylmercaptan, n-tetradecylmercaptan, n-hexylmercaptan, and the like. The amount of the chain transfer agent is preferable from 0.01 to 5 parts by weight per 100 parts by weight of the vinyl monomer (a). If the amount is less than 0.01 part by weight, no effect of the use thereof is obtained, and if the amount is more than 5 parts by weight, the polymerization velocity tends to decrease, so the production efficiency is lowered.

Preferably, the reaction temperature in the polymerization of the vinyl monomer (a) is from 30 to 120° C.

Preferably, pH of the polymerization system is from 1.2 to 12, especially 2 to 11. If the pH is less than 1.2 or more than 12, when (meth)acrylic ester monomers are used as the vinyl monomer (a), the ester bonds in the side chains thereof are easy to be hydrolyzed during the polymerization.

Preferably, the thus obtained aqueous emulsion of vinyl homo- or copolymer (A) has a solid concentration of 0.1 to 50% by weight, especially 0.5 to 40% by weight. If the solid concentration is less than 0.1% by weight, the particle size of the obtained aqueous silicone rubber particle-containing emulsion tends to become large. If the solid concentration is more than 50% by weight, the stability of the emulsion tends to be lowered.

The aqueous silicone rubber particle-containing emulsion can be obtained by adding an emulsion of silicone rubber-forming component (b) to the aqueous emulsion of vinyl homo- or copolymer (A) and polymerizing the silicone rubber-forming component (b) under an acidic or basic condition to form silicone rubber (B). In particular, from the viewpoint that the particle size of the obtained silicone rubber particle-containing aqueous emulsion is easy to become small, it is preferable to polymerize the component (b) under an acidic condition.

The polymerization of the silicone rubber-forming component (b) in the emulsion state can be carried out by mixing the silicone rubber-forming component (b), an emulsifier (hereinafter referred to as "emulsifier ($\beta$)") and water, applying a mechanical shearing force to the resulting mixture to prepare an emulsion, adding the resulting emulsion to the above-mentioned aqueous emulsion of vinyl homo- or copolymer (A) and heating the mixed emulsion at a temperature of not less than 60° C. under an acidic or basic condition.

Of the compounds included in the silicone rubber-forming component (b), an organosiloxane and a difunctinal silane compound may be firstly polymerized to form an aqueous emulsion containing silicone rubber particles and, thereafter, a silane compound having a functionality of at least 3 and/or a polymerizable vinyl group-containing silane compound may be added thereto as they are or in the form of an emulsion in amounts within the ranges mentioned above under an acidic or basic condition, followed by polymerization thereof. The addition of the polymerizable vinyl group-containing silane compound in such a manner is preferable, since the polymerizable vinyl group is prevented from being deactivated by heating in the polymerization for producing the silicone rubber (B).

As the emulsifier ($\beta$), in general, aninonic and non-ionic surfactants which do not lose an emulsifying ability under an acidic condition are used under an acidic condition, and cationic surfactants are used under a basic condition. Examples of the anionic surfactant are, for instance, alkylbenzenesulfonic acid, sodium alkylbenzenesulfonate, alkylsulfonic acid, sodium alkylsulfonate, sodium (di)alkyl sulfosuccinate, sodium polyoxyethylene nonylphenyl ether sulfonate, sodium alkylsulfate, and the like. These may be used alone or in admixture thereof. Examples of the non-ionic surfactant are, for instance, polyoxyethylene nonylphenyl ether, polyoxyethylene lauryl ether, and the like. The non-ionic surfactants may be used alone or in admixture thereof or may be used in combination with anionic surfactants. Examples of the cationic surfactant are, for instance, benzylmethyldodecyl ammonium hydroxide, octyltrimethyl ammonium chloride, dodecyltrimethyl ammonium chloride, hexadecyltrimethyl ammonium chloride, and the like. These may be used alone or in admixture thereof. Among the above, from the viewpoint of a relatively high effect of stabilizing emulsion, preferred are alkylbenzenesulfonic acid, sodium alkylbenzenesulfonate, alkylsulfonic acid, sodium alkylsulfonate, sodium (di)alkyl sulfosuccinate, and benzylmethyldodecyl ammonium hydroxide. Further, alkylbenzenesulfonic acid, alkylsulfonic acid and benzylmethyldodecyl ammonium hydroxide are particularly preferred since they also serves as a polymerization catalyst for the silicone rubber-forming component. The emulsifier ($\beta$) may be the same as or different from the emulsifier ($\alpha$).

Preferably, the amount of the emulsifier ($\beta$) is at least 0.05 part by weight, especially at least 0.1 part by weight, per 100 parts by weight of the total of the vinyl monomer (a) and the silicone rubber-forming component (b), but is adjusted so that the total amount with the emulsifier ($\alpha$) is at most 8 parts by weight, preferably at most 7 parts by weight, more preferably at most 6 parts by weight, per 100 parts by weight of the silicone rubber-forming component (b). If the amount of the emulsifier ($\beta$) is less than 0.05 part by weight, the silicone rubber-forming component (b) is easy to cause phase separation, so the polymerization velocity of the component (b) tends to be lowered. If the total amount of the emulsifiers ($\alpha$) and ($\beta$) exceeds 8 parts by weight, the appearance of thermoplastic resins tends to be deteriorated when the product is used, for example, as an impact modifier or a slipping agent for the resins.

Also, it is preferable that the total amount of the emulsifiers ($\alpha$) and ($\beta$) is from 0.5 to 8 parts by weight, especially 1.5 to 7 parts by weight, per 100 parts by weight of the total of the vinyl monomer (a) and the silicone rubber-forming component (b). If the total amount is less than 0.5 part by weight, the stability of the aqueous silicone rubber particle-containing emulsion tends to be lowered, and if the total amount is more than 8 parts by weight, the appearance of thermoplastic resins tends to be deteriorated when the product is used, for example, as an impact modifier for the resins, or the water repellency is deteriorated when used as a fiber treating agent or a coating material.

The polymerization conversion in the preparation of the vinyl homo- or copolymer (A) from the vinyl monomer (a) is usually at least 95% by weight, and the polymerization conversion in the polymerization of the silicone rubber-forming component (b) in the presence of the vinyl homo- or copolymer (A) from the vinyl monomer (a) is usually at least 80% by weight. Therefore, in order to control the amount of emulsifiers included in the final emulsion to 10 parts by weight or less per 100 parts by weight of the silicone rubber (B), it is preferable to use the emulsifiers so that the total amount of the emulsifiers used, namely total amount of the emulsifiers ($\alpha$) and ($\beta$), is at most 10 parts by weight, especially at most 8 parts by weight, more especially at most 6 parts by weight, per 100 parts by weight of the total of (amount of vinyl monomer (a))×95% by weight and (amount of silicone rubber-forming component (b))×80% by weight. The lower limit of the total amount of the emulsifiers is 0.6 part by weight from the viewpoints of controlling the number average particle size of the silicone rubber emulsion to at most 0.1 $\mu$m and maintaining the emulsion stable.

Preferably, from the viewpoint of handling of the obtained aqueous silicone rubber particle-containing emulsion, water is used in such an amount that the solid concentration of the falls within the range of 10 to 50% by weight.

Preferably, the preparation of the emulsion of silicone rubber-forming component (b) is carried out by stirring a mixture of component (b), emulsifier ($\beta$) and water with a high speed agitator such as a homomixer or a special dispersing machine such as a high pressure homogenizer or a ultrasonic dispersing machine so that the average liquid droplet size becomes 100 $\mu$m or less, since the polymerization proceeds at an adequate rate.

The emulsion of the silicone rubber-forming component (b) can be added at once to an aqueous emulsion of the vinyl polymer (A). However, since a narrower particle size distribution is achieved, it is preferable to divide the emulsion of the component (b) into two or more portions and add them, or to add dropwise the emulsion of the component (b) so that the rate of the addition of the component (b) is at most 40 parts by weight per hour based on 100 parts by weight of the total of the vinyl polymer (A) and the component (b).

In case of adding the emulsion at once, the polymerization system can be made acidic or basic in either stage of before or after the addition of the emulsion of the silicone rubber-forming component (b). However, in case of the intermittent addition or the dropwise addition, it is preferable to make the system acidic or basic before the addition.

The acidic condition is adjusted by adding an inorganic acid such as sulfuric acid or hydrochloric acid or an organic acid such as alkylsulfonic acid, alkylbenzenesulfonic acid or trifluoroacetic acid to the system. The pH of the system is preferably from 1.0 to 3, especially 1.2 to 2.5. If the pH is less than 1.0, when the vinyl polymer (A) is (meth)acrylic ester polymers, the ester bonds in the side chains thereof are easy to be hydrolyzed, and if the pH is more than 3, the rate of the polymerization of silicone rubber-forming component (b) tends to be lowered.

When an alkylsulfonic acid or an alkylbenzenesulfonic acid has been used as the emulsifier ($\alpha$), it is possible to decrease the amount of an acid to be added.

The basic condition is adjusted by adding an inorganic base such as sodium hydroxide, potassium hydroxide or ammonia, or an organic base such as pyridine or benzylmethyldodecyl ammonium hydroxide to the system. The pH of the system is preferably from 11 13.5, especially 11.5 to 13. If the pH is less than 11.0, the polymerization velocity of the silicone rubber-forming component (b) tends to be lowered. If the pH is more than 13, when the vinyl polymer (A) is (meth)acrylic ester polymers, the ester bonds in the side chains thereof are easy to be hydrolyzed.

When benzylmethyldodecyl ammonium hydroxide has been used as the emulsifier ($\alpha$), it is possible to decrease the amount of a base to be added.

Preferably, the polymerization of the silicone rubber-forming component (b) is carried out at a temperature of 60 to 120° C., especially 70 to 100° C., since the polymerization velocity is adequate.

The thus obtained aqueous emulsion containing silicone rubber particles is preferably nuetralized, in order to raise the storage stability, by the addition of a basic aqueous solution such as sodium hydroxide or potassium hydroxide when the polymerization has been conducted under an acidic condition, or an acid aqueous solution such as sulfuric acid or hydrochloric acid when the polymerization has been conducted under a basic condition. Before the neutralization, in other words, under the acidic or basic condition, the Si—O—Si bond which constitutes the silicone rubber backbone is in an equilibrium state between severance and formation, and this equilibrium varies depending on the temperature. The equilibrium shifts to the formation side as the temperature lowers and, therefore, a silicone rubber having a high molecular weight or a high degree of crosslinking is easy to be produced. Thus, when it is desired to obtain a silicone rubber having a high molecular weight or a high degree of crosslinking, it is preferable, after conducting the polymerization at a temperature of 60° C. or higher, that the reaction mixture is cooled to about room temperature, maintained at that temperature for 5 to 100 hours and then neutralized.

The preparation of an aqueous emulsion containing polymer particles obtained by preparing an emulsion containing both a vinyl monomer (a) and a silicone rubber-forming component (b), firstly polymerizing the vinyl monomer (a) and then polymerizing the component (b) can be carried out, for example, in the following manner.

Firstly, the vinyl monomer (a) and the silicone rubber-forming component (b) are mixed to prepare a mixture thereof. To the mixture is added a radical polymerization initiator, and it is mixed with an emulsifier and water and applied with mechanical shear to prepare an emulsion. The emulsion is subjected to a polymerization of the vinyl monomer (a) and is then made acidic or basic to polymerize the silicone rubber-forming component, thus the aqueous emulsion containing silicone rubber particles can be obtained.

As the vinyl monomer (a), the silicone rubber-forming component (b) and the radical polymerization initiator can be used those used in the above-mentioned process of the preparation of polymer particles by polymerizing the component (b) in the presence of the particles of vinyl polymer (A). The amounts of the respective components may also be the same.

The above-mentioned emulsifier (β) is used as the emulsifier in this process. It is preferable that the amount of the emulsifier is from 0.5 to 8 parts by weight, especially 1.5 to 7 parts by weight, per 100 parts by weight of the total of the vinyl monomer (a) and the silicone rubber-forming component (b). If the amount is less than 0.5 part by weight, the stability of the aqueous silicone rubber emulsion tends to be lowered. If the amount exceeds 8 parts by weight, the appearance of thermoplastic resins tends to be deteriorated when the product is used, for example, as an impact modifier or a slipping agent for the resins, or the water repellency tends to be deteriorated when used as a fiber treating agent or a coating material.

The preparation of an emulsion by mechanical shearing can be conducted by the same method under the same condition as those in the above-mentioned preparation of the emulsion of silicone rubber-forming component (b).

The polymerization of each of the vinyl monomer (a) and the silicone rubber-forming component (b) can be conducted under the conditions as applied to the above-mentioned preparation of polymer particles by polymerizing the component (b) in the presence of the particles of vinyl polymer (A).

The thus obtained aqueous emulsion containing silicone rubber particles tends to have a larger number average particle size within the range of 0.01 to 0.1 μm, though the particle size distribution thereof is not different from that of the aqueous emulsion containing silicone rubber particles obtained by polymerizing the component (b) in the presence of the particles of vinyl polymer (A).

The aqueous silicone rubber particle-containing emulsions of the present invention obtained by the procedures as mentioned above are suitably employed in uses such as impact modifier, fiber treating agent, slipping agent, water repellent, processing aid for molding materials, flame retardant, coating material and the like.

Aqueous emulsions containing silicone rubber-based graft copolymer particles (which are also referred to as "graft copolymer particles" hereinafter) according to the present invention can be prepared by polymerizing a vinyl monomer (c) in the presence of the aqueous silicone rubber particle-containing emulsion.

The graft copolymer particles have a structure that a polymer of the vinyl monomer (c) is grafted onto the polymer particles comprising the vinyl polymer (A) and the silicone rubber (B). Preferred are the graft copolymer particles having a number average particle size of at least 0.008 μm, especially at least 0.01 μm, and of at most 0.3 μm, especially at most 0.1 μm. The graft copolymer particles having a number average particle size of less than 0.008 μm is hard to prepare. If the number average particle size is more than 0.3 μm, the properties of silicone rubber tend to be difficult to exhibit.

The content of insoluble matter in the graft copolymer particles as measured by immersing the particles in toluene at room temperature for 24 hours is preferably at least 10% by weight, especially at least 50% by weight. If the content of toluene-insoluble matter is less than 10% by weight, the proportion of a non-grafted polymer of the vinyl monomer (c) increases, so lowering of various physical properties tends to be brought, for example, when the particles are used as impact modifier, fiber treating agent, coating material or the like.

The vinyl monomer (c) is used, for example, to raise the compatibility between silicone rubber-containing polymer particles and a thermoplastic resin so as to uniformly disperse the particles into the thermoplastic resin for the purpose of improving the impact resistance of the thermoplastic resin, or to improve the adhesion with fibers as required when used as a fiber treating agent, or improve the film-forming property as required when used as a coating material.

Preferably, the ratio of the vinyl monomer (c) to the polymer particles included in the above-mentioned aqueous silicone rubber particle-containing emulsion is from 5/95 to 95/5 by weight, especially from 10/90 to 90/10 by weight. If the proportion of the vinyl monomer (c) is too large, for example, a sufficient impact resistance tends to be not exhibited when used as an impact modifier because the content of the silicone rubber (B) is too low, or properties such as water repellency tend to be lowered when used as a fiber treating agent, or the film-forming property tends to be deteriorated when used as a coating material. If the proportion of the vinyl monomer (c) is too small, properties such as compatibility with thermoplastic resins, adhesion with fibers and film strength are not sufficiently improved.

Radical polymerization initiators used in the graft polymerization may be those used in the polymerization of vinyl monomer (a), and the amount thereof may be the same as in the polymerization of vinyl monomer (a). Also, in case of using them in combination with reducing agents, those used in the polymerization of vinyl monomer (a) may be used. In case of using chain transfer agents, too, those used in the polymerization of vinyl monomer (a) may be used, and the amount thereof may be the same.

The polymerization of the vinyl monomer (c) in the presence of the aqueous silicone rubber particle-containing emulsion can be carried out by a usual seed emulsion polymerization method. In particular, it is preferable to carry out the polymerization with adding dropwise a liquid mixture of a vinyl monomer (c) and a radical polymerization initiator. Also, the vinyl monomer (c) may be polymerized in one stage or in multistage.

In the above polymerization, if the silicone rubber (B) contains polymerizable vinyl groups, the vinyl monomer (c)

reacts with the polymerizable vinyl groups of the silicone rubber (B) to form grafts upon the polymerization of the vinyl monomer (c) through a radical polymerization initiator. If the vinyl homo- or copolymer (A) is crosslinked, the vinyl monomer (c) also reacts with one of polymerizable vinyl groups, which remains unreacted, of a monomer having at least two polymerizable vinyl groups used as a crosslinking agent, to form grafts. In case that neither the silicone rubber (B) nor the vinyl polymer (A) have a polymerizable vinyl group, if a specific radical polymerization initiator such as t-butyl peroxylaurate is used, it abstracts a hydrogen from an organic group such as methyl group bonded to silicon atom and the vinyl monomer (c) polymerizes to the resulting radicals to form grafts.

Also, if a vinyl monomer (c) containing 0.1 to 30% by weight, preferably 0.5 to 20% by weight, of a polymerizable vinyl group-containing silane compound is polymerized and subjected to a redistribution reaction under an acidic condition of not more than pH 5 or a basic condition of not less than pH 11, grafts are formed. The reason is that the Si—O—Si bond in the main backbone of the silicone is in an equilibrium state of severance and formation under the acidic or basic condition and, therefore, if a vinyl monomer and a polymerizable vinyl group-containing silane compound are copolymerized in this equilibrium state, the silane present as the side chain of a vinyl copolymer which has been produced by the polymerization or is in the course of production, reacts with the silicone chain to form a graft. If the amount of the polymerizable vinyl group-containing silane compound is less than 0.1% by weight, the proportion of grafting of the vinyl monomer (c) is lowered, so the toluene-insoluble matter content of the graft copolymer particles tends to be decreased, and if the amount is more than 30% by weight, the stability of emulsion tends to be lowered.

From the viewpoint of raising the toluene-insoluble matter content of the graft copolymer particles, it is preferable to prepare the graft copolymer particles by utilizing the redistribution reaction.

Thus, aqueous emulsions containing silicone rubber-based graft copolymer particles wherein the vinyl monomer (c) is graft-polymerized onto the silicone rubber particles as mentioned above are obtained. Such aqueous emulsions are suitably used as impact modifier, slipping agent, fiber treating agent, coating material and the like.

In the polymerization of vinyl monomer (c) in the presence of the aqueous silicone rubber emulsion, the vinyl monomer (c) polymerizes alone without a portion corresponding to the graft of the graft copolymer (namely a polymer of the vinyl monomer (c)) being grafted onto the backbone (namely polymer particles comprising vinyl polymer (A) and silicone rubber (B)) to by-produce so-called free polymer. Thus, the graft polymerization product is obtained in the form of a mixture of a graft copolymer and a free polymer. The term "graft copolymer" as used herein comprehends such a mixture of a graft copolymer and a free polymer.

Recovery of a polymer powder from the aqueous silicone rubber emulsion and the aqueous graft copolymer emulsion as obtained above is carried out by a conventional method, for example, by adding to the aqueous emulsion a metal salt such as calcium chloride, magnesium chloride or magnesium sulfate or an inorganic or organic acid such as hydrochloric acid, sulfuric acid, phosphoric acid or acetic acid to coagulate the aqueous emulsion, followed by dehydration and drying of the deposited polymer. A spray drying method is also applicable.

The powder of these silicone rubber and graft copolymer can be utilized as impact modifier, slipping agent, water repellent, processing aid for molding materials, flame retardant and the like.

The thus obtained silicone rubber particles and graft copolymer particles are incorporated into various thermoplastic resins to give thermoplastic resin compositions having improved impact resistace, processability, slippability and flame resistance.

Examples of the thermoplastic resin are, for instance, polyvinyl chloride, polystyrene, styrene-acrylonitrile copolymer, styrene-acrylonitrile-N-phenylmaleimide copolymer, α-methylstyrene-acrylonitrile copolymer, polymethyl methacrylate, methyl methacrylate-styrene copolymer, ABS resin, AAS resin, AES resin, polycarbonate, polyamide, polyester such as polyethylene terephthalate or polybutylene terephthalate, polyphenylene ether, known impact modifiers such as acrylic rubber-containing impact modifier, impact modifier containing acrylic-silicone composite rubber and butadiene rubber-containing impact modifier, and other known thermoplastic resins.

The silicone rubber particles are used in an amount of 0.1 to 100 parts by weight per 100 parts by weight of a thermoplastic resin. From the viewpoint of a balance of physical properties, preferably the amount is from 0.3 to 80 parts by weight per 100 parts by weight of a thermoplastic resin. If the amount is too small, no effect of the addition is obtained, and if the amount is too large, it is difficult to maintain the properties such as rigidity and surface hardness of the thermoplastic resins.

The graft copolymer particles are used in an amount of 1 to 150 parts by weight per 100 parts by weight of a thermoplastic resin. From the viewpoint of a balance of physical properties, preferably the amount is from 3 to 120 parts by weight per 100 parts by weight of a thermoplastic resin. If the amount is too small, no effect of the addition is obtained, and if the amount is too large, it is difficult to maintain the properties such as rigidity and surface hardness of the thermoplastic resins.

Also, the silicone rubber particles and the graft copolymer particles may be incorporated together into a thermoplastic resin. In that case, the amount of each of them may be selected within the above ranges.

Mixing of a thermoplastic resin with the silicone rubber powder and/or the graft copolymer powder isolated from the emulsions can be carried out by firstly mixing them through a Henschel mixer, a ribbon mixer or the like and then melt-kneading the mixture through a roll mill, an extruder, a kneader or the like.

The thermoplastic resin composition can also be obtained by mixing an emulsion of a thermoplastic resin with the silicone rubber emulsion and/or the graft copolymer emulsion and subjecting the mixed emulsion to coprecipitation of polymer particles.

The thermoplastic resin compositions of the present invention may contain conventionally used additives, e.g., plasticizer, stabilizer, lubricant, ultraviolet absorber, antioxidant, flame retardant, pigment, glass fiber, filler, high molecular processing aid and high molecular lubricant.

Molding methods conventionally used for thermoplastic resin compositions, e.g., injection molding, extrusion, blow molding and calendering, are applicable to the thermoplastic resin compositions of the present invention.

The obtained molded articles have excellent properties such as impact resistance, slipping property and flame resistance.

The present invention is more specifically explained by means of examples, but it is to be understood that the present invention is not limited to only these examples. In the examples, all parts and % excepting variation coefficient are by weight unless otherwise noted.

In the following examples and comparative examples, measurement and evaluation were made in the following manners.

[Polymerization Conversion]

Vinyl Monomer (a)

An aqueous emulsion of vinyl homo- or copolymer (A) was dried in a hot air dryer at 120° C. for 1 hour to measure the content of solid matter of vinyl homo- or copolymer (A). The polymerization conversion was calculated according to the following equation.

[Solid matter content of vinyl polymer (A)/Amount of vinyl monomer (a) charged]×100 (% by weight)

Silicone Rubber-forming Component (b)

An aqueous emulsion containing silicone rubber particles was dried in a hot air dryer at 120° C. for 1 hour to measure the content of solid matter of vinyl homo- or copolymer-containing silicone rubber. The polymerization conversion was calculated according to the following equation.

[Solid matter content of vinyl homo- or copolymer-containing silicone rubber−Solid matter content of vinyl polymer (A)/Amount of silicone rubber-forming component charged]×100 (% by weight)

[Average Particle Size]

Using a measuring apparatus, NICOMP MODEL 370 Particle Size Analyzer made by PACIFIC SCIENTIFIC CO., the number average particle size ($\mu$m) and the variation coefficient in particle size distribution (standard deviation/number average particle size)(%) were measured by a dynamic light scattering method.

[Content of Toluene-insoluble Matter]

A vinyl polymer-containing silicone rubber obtained from an emulsion by drying it was immersed in toluene at room temperature for 24 hours, and was centrifuged at 12,000 r.p.m. for 60 minutes to measure the content (% by weight) of the toluene-insoluble matter in the vinyl polymer-containing silicone rubber.

[Izod Impact Strength]

The Izod impact strength was measured by using a notched ¼ inch bar according to ASTM D-256. The testing temperature is 23° C. unless otherwise noted.

[Falling Ball Impact Strength]

The test was made using a molded sheet having a size of 150×100×2 (mm) prepared by injection molding, and the 50% failure energy at 23° C. (falling ball weight×height) (kg·m) was calculated.

[Appearance of Molded Article]

The appearance of the molded sheet used in the evaluation of falling ball impact strength was visually observed and evaluated according to the following criteria.

o: The surface state is good.

X: A black stripe patter is observed in the surface.

[Processability]

A resin composition was injected from an injection molding machine (model FAS100B made by Kabushiki Kaisha FUNAC) at a cylinder temperature of 250° C. and an injection pressure of 1,350 kgf/cm$^2$, and the flow length of the resin in a spiral mold having a thickness of 3 mm was measured.

[Slippability]

Using the molded sheet used in the evaluation of falling ball impact strength, the coefficient of dynamic friction was measured by a surface testing machine model HEIDON-14D made by Shinto Kagaku Kogyo Kabushiki Kaisha, wherein a molded sheet of polymethyl methacrylate having a size of 40×40×3 (mm) was used as the opposite material and the test was made under a vertical load of 500 g at a sliding rate of 30 mm/minute.

[Flame Resistance]

Evaluation was made by UL94 V test using ¹⁄₁₂ inch bar.

[Gloss]

The gloss was evaluated by 60° light reflectance using a gloss meter model VG-10 made by Nippon Denshoku Kogyo Kabushiki Kaisha.

EXAMPLE 1

[Preparation of Aqueous Emulsion (C-1) Containing Silicone Rubber Particles]

A five-necked flask equipped with a stirrer, a reflux condenser, an inlet for introducing nitrogen gas, an inlet for introducing monomers and a thermometer was charged with the following ingredients.

| Ingredients | Amount (part) |
| --- | --- |
| Pure water | 190 |
| Sodium dodecylbenzenesulfonate (SDBS) | 1.5 |
| Formaldehyde sodium sulfoxylate (SFS) | 0.2 |
| Disodium ethylenediaminetetraacetate (EDTA) | 0.004 |
| Ferrous sulfate | 0.001 |

The temperature was then raised to 40° C. with purging the system with nitrogen gas, and a mixture (vinyl monomer (a) component) composed of the following ingredients was added at a time to the system, stirred for 1 hour to complete the polymerization, thus giving an aqueous emulsion of BA polymer (A-1).

| Ingredients | Amount (part) |
| --- | --- |
| Butyl acrylate (BA) | 1 |
| Cumene hydroperoxide (CHP) | 0.001 |

The polymerization conversion was 99%, and the obtained emulsion has a solid content of 1.4%, a number average particle size of 0.01 $\mu$m and a variation coefficient of 38%. Also, the content of toluene-insoluble matter in the BA polymer was 0%.

Separately, an emulsion of silicone rubber-forming component (b) was prepared by stirring a mixture of the following ingredients at 10,000 r.p.m. for 5 minutes with a homomixer.

| Ingredients | Amount (part) |
| --- | --- |
| Pure water | 70 |
| SDBS | 0.5 |
| Octylmethylcyclotetrasiloxane (D4) | 94 |
| γ-Methacryloyloxypropyldimethoxymethylsilane (DSMA) | 2 |
| Tetraethoxysilane (TEOS) | 3 |

Subsequently, the aqueous emulsion containing BA polymer (A-1) was kept at 90° C., and thereto were added 2 parts of dodecylbenzenesulfonic acid (DBSA) and 18 parts of pure water to adjust the system to pH 1.2. The emulsion of silicone rubber-forming component (b) was equally divided into four portions, and the portions were added every 1 hour at a time to the above aqueous emulsion. After the completion of the addition, the system was further stirred for 1 hour, cooled to 25° C. and allowed to stand for 20 hours. Thereafter, the system was adjusted to pH 8.9 with sodium hydroxide to finish the polymerization, thus giving an aqueous emulsion (C-1) containing silicone-rubber particles. The polymerization conversion of the silicone rubber-forming component (b) was 87%. The emulsion (C-1) had a solid content of 24%. The results of evaluation about the amount of emulsifier (SDBS+DBSA) used in the preparation of the emulsion (C-1), number average particle size, variation coefficient in particle size distribution and content of toluene-insoluble matter are shown in Table 1.

Comparative Example 1

An aqueous emulsion (C'-1) containing silicone rubber particles was prepared in the same manner as in Example 1 except that the BA polymer (A-1) was not prepared, namely SFS, EDTA, ferrous sulfate, BA and CHP were not used. The polymerization conversion of the silicone rubber-forming component (b) was 87%, and the emulsion (C'-1) had a solid content of 24%. The results of evaluation about the amount of emulsifier (SDBS+DBSA) used in the preparation of the emulsion (C'-1), number average particle size, variation coefficient in particle size distribution and content of toluene-insoluble matter are shown in Table 1.

Comparative Example 2

An aqueous emulsion containing silicone rubber particles was prepared by a method disclosed in Japanese Patent Publication Kokai No. 5-194740 (hereinafter referred to as "conventional method"). That is to say, an aqueous emulsion (C'-2) containing silicone rubber particles was prepared in the same manner as in Comparative Example 1 except that the polymerization was conducted by adding dropwise the emulsion of silicone rubber-forming component (b) over 3 hours. The polymerization conversion of the silicone rubber-forming component (b) was 86%, and the emulsion (C'-2) had a solid content of 24%. The results of evaluation about the amount of emulsifier (SDBS+DBSA) used in the preparation of the emulsion (C'-2), number average particle size, variation coefficient in particle size distribution and content of toluene-insoluble matter are shown in Table 1.

Comparative Example 3

An aqueous emulsion (C'-3) containing silicone rubber particles was prepared in the same manner as in Comparative Example 2 except that the DBSA was used in an amount of 4 parts instead of 2 parts. The polymerization conversion of the silicone rubber-forming component (b) was 88%, and the emulsion (C'-3) had a solid content of 24%. The results of evaluation about the amount of emulsifier (SDBS+DBSA) used in the preparation of the emulsion (C'-3), number average particle size, variation coefficient in particle size distribution and content of toluene-insoluble matter are shown in Table 1.

Comparative Example 4

An aqueous emulsion (C'-4) containing silicone rubber particles was prepared in the same manner as in Comparative Example 2 except that the DBSA was used in an amount of 10 parts instead of 2 parts. The polymerization conversion of the silicone rubber-forming component (b) was 87%, and the emulsion (C'-4) had a solid content of 24%. The results of evaluation about the amount of emulsifier (SDBS+DBSA) used in the preparation of the emulsion (C'-4), number average particle size, variation coefficient in particle size distribution and content of toluene-insoluble matter are shown in Table 1.

TABLE 1

|  | Aqueous emulsion | Emulsifier (SDBS + DBSA) (part) | Number average particle size (nm) | Fluctuation coefficient (%) | Content of toluene-insoluble matter (%) |
| --- | --- | --- | --- | --- | --- |
| Ex. 1 | C-1 | 4 | 0.01 | 35 | 87 |
| Com. Ex. 1 | C'-1 | 4 | 0.07 | 79 | 86 |
| Com. Ex. 2 | C'-2 | 4 | 0.07 | 80 | 87 |
| Com. Ex. 3 | C'-3 | 6 | 0.04 | 70 | 85 |
| Com. Ex. 4 | C'-4 | 12 | 0.01 | 40 | 85 |

It is found from Table 1 that according to the present invention, aqueous silicone rubber emulsions containing very fine particles and having a narrow particle size distribution are obtained by the presence of the vinyl homo- or copolymer (A). It is also found that the conventional method requires three times amount of an emulsifier to obtain emulsions having a particle size and a variation coefficient in particle size distribution on the same level as those obtained in Example 1 according to the present invention.

EXAMPLES 2 to 7 and

Comparative Examples 5 and 6

[Preparation of Aqueous Emulsions (C-2) to (C-7), (C'-5) and (C'-6) Containing Silicone Rubber Particles]

The procedure of Example 1 was repeated except that the kinds and amounts of the vinyl monomer (a) and the silicone rubber-forming component (b) were changed to those shown in Table 2.

In Table 2, St denotes styrene, MMA denotes methyl methacrylate, and MPrDMS denotes mercaptopropyldimethoxymethyl-silane.

The results are shown in Table 3.

From Table 3, it is understood that even if the kind and amount of the vinyl monomer are changed, there are obtained aqueous emulsions containing silicone rubber particles having a number average particle size of not more than 0.1 μm and a variation coefficient in particle size distribution of not more than 65%. It is also understood that if the amount of the vinyl monomer (a) is less than 0.1 part, the particle size becomes large. It is further understood that if the amount of the vinyl monomer (a) is more than 40 parts, the polymerization conversion of the silicone rubber-forming component is decreased, so the aqueous silicone rubber emulsions of the present invention are not obtained.

TABLE 2

| | Aqueous emulsion | Vinyl monomer (a) | | | | Silicone rubber-forming component (b) | | | |
|---|---|---|---|---|---|---|---|---|---|
| | | BA | St | MMA | CHP | D4 | TEOS | DSMA | MPrDMS |
| Ex. 2 | C-2 | 2 | — | — | 0.002 | 94 | 2 | — | 2 |
| Ex. 3 | C-3 | 5 | — | — | 0.005 | 93 | — | — | 2 |
| Ex. 4 | C-4 | 10 | — | — | 0.010 | 90 | — | — | — |
| Ex. 5 | C-5 | 1.5 | 3.5 | — | 0.005 | 91 | 2 | — | 2 |
| Ex. 6 | C-6 | 1.5 | — | 3.5 | 0.005 | 91 | 2 | 2 | — |
| Ex. 7 | C-7 | 1.5 | — | 3.5 | 0.005 | 91 | 2 | 2 | — |
| Com. Ex. 5 | C'-5 | 0.01 | — | — | 0.0001 | 97.99 | 2 | — | — |
| Com. Ex. 6 | C'-6 | 50 | — | — | 0.050 | 48 | 2 | — | — |

TABLE 3

| | Aqueous emulsion | Conversion (%) | | Solid content of emulsion (%) | Number average particle size (nm) | Fluctuation coefficient (%) | Content of toluene-insoluble matter (%) |
|---|---|---|---|---|---|---|---|
| | | Component (a) | Component (b) | | | | |
| Ex. 2 | C-2 | 99 | 86 | 23 | 0.01 | 38 | 84 |
| Ex. 3 | C-3 | 99 | 86 | 23 | 0.01 | 44 | soluble |
| Ex. 4 | C-4 | 99 | 85 | 23 | 0.02 | 40 | soluble |
| Ex. 5 | C-5 | 99 | 87 | 24 | 0.04 | 33 | 82 |
| Ex. 6 | C-6 | 99 | 87 | 24 | 0.02 | 60 | 82 |
| Ex. 7 | C-7 | 99 | 87 | 24 | 0.05 | 30 | 60 |
| Com. Ex. 5 | C'-5 | 99 | 86 | 23 | 0.07 | 79 | 86 |
| Com. Ex. 6 | C'-6 | 99 | 72 | 23 | 0.09 | 35 | 85 |

EXAMPLE 8
[Preparation of Aqueous Emulsion (C-8) Containing Silicone Rubber Particles]

A BA polymer was prepared as follows:

A five-necked flask equipped with a stirrer, a reflux condenser, an inlet for introducing nitrogen gas, an inlet for introducing monomers and a thermometer was charged with the following ingredients.

| Ingredients | Amount (part) |
|---|---|
| Pure water | 190 |
| SDBS | 1.5 |
| Potassium persulfate | 0.002 |

The temperature was then raised to 70° C. with purging the system with nitrogen gas, and 1 part of BA was added at a time to the system, stirred for 1 hour to complete the polymerization, thus giving an aqueous emulsion of BA polymer (A-8). The polymerization conversion was 99%, and the obtained emulsion has a solid content of 1.3%, a number average particle size of 0.01 μm and a variation coefficient of 34%. Also, the content of toluene-insoluble matter in the BA polymer (A-8) was 0%.

Then, an aqueous emulsion (C-8) containing silicone rubber particles was prepared in the same manner as in Example 1 except that the BA polymer (A-8) was used instead of BA polymer (A-1). The polymerization conversion of the silicone rubber-forming component (b) was 87%. The emulsion (C-8) had a solid content of 23%, a number average particle size of 0.01 μm and a variation coefficient of 37%. Also, the content of toluene-insoluble matter in the silicone rubber particles was 85%.

It is found that aqueous emulsions containing fine silicone rubber particles are obtained even if the kind of the radical polymerization initiator is changed.

EXAMPLE 9
[Preparation of Aqueous Emulsion (C-9) Containing Silicone Rubber Particles]

A five-necked flask equipped with a stirrer, a reflux condenser, an inlet for introducing nitrogen gas, an inlet for introducing monomers and a thermometer was charged with the following ingredients.

| Ingredients | Amount (part) |
|---|---|
| Pure water | 190 |
| Hexadecyltrimethyl ammonium chloride | 2 |
| Potassium persulfate | 0.002 |

The temperature was then raised to 70° C. with purging the system with nitrogen gas, and 2 parts of BA was added at a time to the system, stirred for 1 hour to complete the polymerization, thus giving an aqueous emulsion of BA polymer (A-9). The polymerization conversion was 99%, and the obtained emulsion has a solid content of 2.1%, a number average particle size of 0.02 μm and a variation coefficient of 38%. Also, the content of toluene-insoluble matter in the BA polymer was 0%.

Separately, an emulsion of silicone rubber-forming component (b) was prepared by stirring a mixture of the following ingredients at 10,000 r.p.m. for 5 minutes with a homo-mixer.

| Ingredients | Amount (part) |
| --- | --- |
| Pure water | 70 |
| HdAC | 2 |
| D4 | 78 |
| N-(2-aminoethyl)-3-aminopropylmethyldimethoxysilane | 10 |

Subsequently, the aqueous emulsion containing BA polymer (A-9) was kept at 90° C., and thereto were added potassium hydroxide to adjust the system to pH 13. The emulsion of silicone rubber-forming component (b) was equally divided into four portions, and the portions were added every 1 hour at a time to the above aqueous emulsion. After the completion of the addition, the system was further stirred for 1 hour, cooled to 25° C. and allowed to stand for 20 hours. Thereafter, the system was adjusted to pH 8.9 with hydrochloric acid to finish the polymerization, thus giving an aqueous emulsion (C-9) containing silicone-rubber particles. The polymerization conversion of the silicone rubber-forming component (b) was 87%. The emulsion (C-9) had a solid content of 22%, a number average particle size of 0.02 μm and a variation coefficient in particle size distribution of 35%. Also, the content of toluene-insoluble matter in the silicone rubber particles was 90%.

It is found that aqueous emulsions containing fine silicone rubber particles are obtained even if the kind of the emulsifier used is changed.

EXAMPLES 10 and 11 and

COMPARATIVE EXAMPLES 7 to 10

[Preparation of Silicone-modified ABS Resin and Silicone-modified AAS Resin]

(1) Preparation of ABS Resin Emulsion (S-1)

Using a polybutadiene emulsion (trade mark "Nipp1 LX111NF, product of Nippon Zeon Co., Ltd., rubber particle size 0.35 μm, solid content 55%), emulsion (S-1) was prepared as follows:

A five-necked flask equipped with a stirrer, a reflux condenser, an inlet for introducing nitrogen gas, an inlet for introducing monomers and a thermometer was charged with the following ingredients.

| Ingredients | Amount (part) |
| --- | --- |
| Pure water | 190 |
| Polybutadiene (solid matter) | 60 |
| SFS | 0.2 |
| EDTA | 0.004 |
| Ferrous sulfate | 0.001 |

The temperature was then raised to 65° C. with purging the system with nitrogen gas, and a monomer mixture composed of the following ingredients was added dropwise to the system at that temperature over 4 hours. After the completion of the addition, stirring was further continued for 2 hours to give a polybutadiene-based graft copolymer emulsion (X-1).

| Ingredients | Amount (part) |
| --- | --- |
| St | 28 |
| Acrylonitrile (AN) | 12 |
| CHP | 0.001 |

The emulsion (X-1) had a solid content of 29%. The polymerization conversion of the above monomer mixture was 99%.

Separately, an emulsion of an AN-St copolymer was prepared as follows: A five-necked flask equipped with a stirrer, a reflux condenser, an inlet for introducing nitrogen gas, an inlet for introducing monomers and a thermometer was charged with the following ingredients.

| Ingredients | Amount (part) |
| --- | --- |
| Pure water | 200 |
| Sodium dioctylsulfosuccinate | 1.0 |
| SFS | 0.4 |
| EDTA | 0.01 |
| Ferrous sulfate | 0.0025 |

The temperature was then raised to 65° C. with purging the system with nitrogen gas, and a monomer mixture composed of the following ingredients was added dropwise to the system at that temperature over 6 hours. Also, 0.5 part portions of sodium dioctylsulfosuccinate were added to the system after 1 hour and 3 hours from the start of the polymerization. After the completion of the addition of the monomer mixture, stirring was further continued for 1 hour to give an AN-St copolymer emulsion (Y-1).

| Ingredients | Amount (part) |
| --- | --- |
| St | 70 |
| AN | 30 |
| CHP | 0.2 |

The emulsion (Y-1) had a solid content of 33%. The polymerization conversion of the above monomer mixture was 99%.

The AN-St copolymer emulsion (Y-1) was mixed with the graft copolymer emulsion (X-1) so that the content of polybutadiene became 20% on the solid basis, thus giving an ABS resin emulsion (S-1).

(2) Preparation of AAS Resin Emulsion (S-2)

A five-necked flask equipped with a stirrer, a reflux condenser, an inlet for introducing nitrogen gas, an inlet for introducing monomers and a thermometer was charged with the following ingredients.

| Ingredients | Amount (part) |
| --- | --- |
| Pure water | 200 |
| Sodium dioctylsulfosuccinate | 0.005 |
| SFS | 0.4 |
| EDTA | 0.01 |
| Ferrous sulfate | 0.0025 |

The temperature was then raised to 45° C. with purging the system with nitrogen gas, and 15% of the following monomer mixture was added at a time to the system at that temperature. After stirring for 1 hour, 0.3 part of sodium dioctylsulfosuccinate was added. Then, the remaining monomer mixture was added dropwise over 4 hours. After the completion of the dropwise addition, stirring was further continued for 1 hour to give a polybutyl acrylate rubber emulsion.

| Ingredients | Amount (part) |
| --- | --- |
| BA | 60 |
| Allyl methacrylate (ALMA) | 1 |
| CHP | 0.1 |

The obtained emulsion had a solid content of 23% and an average particle size of 0.30 μm. The polymerization conversion of the above monomer mixture was 99%.

Subsequently, the temperature was kept at 65° C. and the following monomer mixture was added dropwise to the system over 4 hours. After the completion of the addition, stirring was further continued for 2 hours to give a polybutyl acrylate rubber-based graft copolymer emulsion (X-2).

| Ingredients | Amount (part) |
| --- | --- |
| St | 28 |
| AN | 12 |
| CHP | 0.1 |

The emulsion (X-2) had a solid content of 33%. The polymerization conversion of the above monomer mixture was 99%.

The graft copolymer emulsion (X-2) was mixed with the AN-St copolymer emulsion (Y-1) prepared in (1) so that the content of polybutyl acrylate rubber became 20% on the solid basis, thus giving an AAS resin emulsion (S-2).

(3) Preparation of a Silicone-modified ABS Resin and a Silicone-modified AAS Resin The emulsions (S-1) and (S-2) prepared in (1) and (2) were mixed with the silicone rubber emulsion (C-1) or (C'-4) prepared in Example 1 or Comparative Example 4 in the proportions (solid basis) shown in Table 4. To the mixed emulsion was added 0.5 part of a phenolic stabilizer, and the mixed emulsion was coagulated by adding 2 parts of calcium chloride. The coagulated slurry was dehydrated and dried to give silicone-modified and -unmodified ABS resins (ABS-1), (ABS'-1) and (ABS'-2) and silicone-modified and -unmodified AAS resins (AAS-1), (AAS'-1) and (AAS'-2).

TABLE 4

| | | Amount (solid matter) (part) | | | |
| --- | --- | --- | --- | --- | --- |
| | Resin | C-1 | C'-4 | S-1 | S-2 |
| Ex. 10 | ABS-1 | 1 | — | 99 | — |
| Ex. 11 | AAS-1 | 1 | — | — | 99 |
| Com. Ex. 7 | ABS'-1 | — | — | 100 | — |
| Com. Ex. 8 | ABS'-2 | — | 1 | 99 | — |
| Com. Ex. 9 | AAS'-1 | — | — | — | 100 |
| Com. Ex. 10 | AAS'-2 | — | 1 | — | 99 |

Into 100 parts of a powder of each of the modified and modified ABS and AAS resins were incorporated 0.2 part of a phenolic stabilizer (trade mark "AO-20", product of Asahi Denka Kogyo Kabushiki Kaisha) and ethylenebisstearylamide. The mixture was melt-kneaded at 240° C. by a single screw extruder (model HW-40-28 made by Tabata Kikai Kabushiki Kaisha) to give pellets. Using the obtained pellets, ¼ inch Izod impact test specimens and sheet-like molded articles having a size of 150×100×2 mm were prepared and evaluated according to the methods described before.

The results are shown in Table 5.

From Table 5, it is understood that resins (ABS-1, AAS-1) obtained by incorporating a small amount of the silicone rubber particle-containing emulsion of the present invention into the ABS resin emulsion or the AAS resin emulsion exhibit excellent impact strength, processability and slippability with maintaining a good appearance of molded article.

TABLE 5

| | Resin | Izod Impact strength (kg · cm/cm) | Falling ball impact strength (kg · cm) | Appearance of molded article | Processability (mm) | Coefficient of dynamic friction |
| --- | --- | --- | --- | --- | --- | --- |
| Ex. 10 | ABS-1 | 24 | 5.0 | ○ | 810 | 0.12 |
| Ex. 11 | AAS-1 | 14 | 5.2 | ○ | 760 | 0.16 |
| Com. Ex. 7 | ABS'-1 | 22 | 4.6 | ○ | 760 | 0.23 |
| Com. Ex. 8 | ABS'-2 | 22 | 4.8 | X | 780 | 0.16 |
| Com. Ex. 9 | AAS'-1 | 10 | 4.8 | ○ | 720 | 0.29 |
| Com. Ex. 10 | AAS'-1 | 12 | 4.9 | X | 740 | 0.18 |

EXAMPLE 12 and

Comparative Examples 11 and 12

Each of the aqueous emulsions (C-1), (C'-1) and (C'-4) obtained in Example 1 and Comparative Examples 1 and 4 was diluted with water to a solid concentration of 5% to give fiber treating agents. Taffetas of a polyester fiber (fiber A) and cotton broad cloths (fiber B) were immersed into these fiber treating agents. The fibers were taken out and dried at 80° C. for 5 minutes after removing an excess treating agent. The thus treated fibers were allowed to stand for a day and then subjected to the following tests. The results are shown in Table 6.

[Softness]

With respect to the non-treated and treated fibers, the softness was evaluated by feel according to the following criteria.

○: Softness of treated fiber is good.

X: Softness is insufficient.

[Water Repellency]

The surface of the treated fiber was sprayed with water. The state of the surface was observed and evaluated according to the following criteria.

○: Water repellency is good.

X: Water repellency is insufficient.

[Smoothness]

The smoothness of the non-treated and treated fibers was evaluated by feel according to the following criteria.

○: Smoothness of the treated fiber is good.

X: Smoothness is insufficient.

From Table 6, it is understood that the aqueous silicone rubber particle-containing emulsion of the present invention is good in penetration into fibers since the particle size is fine, and is good in water repellency since the amount of an emulsifier contained is small.

emulsion had a solid content of 22%, a number average particle size of 0.03 μm and a variation coefficient in particle size distribution of 30%.

The obtained emulsion (C-10) was coagulated by adding 3 parts of calcium chloride, dehydrated and dried to give a silicone rubber powder. The content of toluene-insoluble matter in this powder was 92%.

(2) Polycarbonate Resin Composition

The obtained silicone rubber powder was incorporated into a polycarbonate or a polycarbonate/polyethylene terephthalate blend, and the mixture was melt-kneaded at 280° C. by a twin screw extruder (model PCM-30 made by Ikegai Tekko Kabushiki Kaisha) to give pellets. The obtained pellets were molded by an injection molding machine (model FAS100B made by Kabushiki Kaisha FUNAC) at a cylinder temperature of 280° C. to give ⅛ inch bar test specimens for Izod impact test and ¹/₁₂ inch bar test specimens for flame resistance evaluation. The Izod impact strength and flame resistance were evaluated according to the methods described before. The results are shown in Table 7.

TABLE 6

|  |  | Fiber A | | | Fiber B | | |
| --- | --- | --- | --- | --- | --- | --- | --- |
|  | Emulsion | Softness | Water repellency | Smoothness | Softness | Water repellency | Smoothness |
| Ex. 12 | C-1 | ○ | ○ | ○ | ○ | ○ | ○ |
| Com. Ex. 11 | C'-1 | X | X | X | X | X | X |
| Com. Ex. 12 | C'-4 | ○ | X | ○ | ○ | X | ○ |

EXAMPLES 13 and 14
and
Comparative Examples 13 and 14

[Preparation of Silicone Rubber Particles and Flame Retardant Resin Composition]

(1) Preparation of Silicone Rubber Particles

An aqueous silicone rubber particle-containing emulsion (C-10) was prepared in the same manner as in Example 2 except that D4 included in the silicone rubber-forming component (b) was used in an amount of 80 parts, 8 parts of methyltrimethoxysilane was used instead of TEOS, 10 parts of diphenyldimethoxysilane was further used, the emulsion containing the silicone rubber-forming component (b) was added at a time and the reaction was carried out at 90° C. for 5 hours. The polymerization conversion of the silicone rubber-forming component (b) was 86%. Also, the obtained The polycarbonate used is a bisphenol A type polycarbonate having a viscosity average molecular weight of 22,000, and the polyethylene terephthalate used is one having a logarithmic viscosity of 0.75. In the table, "–" in the flame resistance V test denotes being below the standards.

From Table 7, it is found that the silicone rubber particles of the present invention have excellent effects of imparting impact resistance and flame resistance to polycarbonate resin and polycarbonate/polyethylene terephthalate blend resin.

TABLE 7

|  | Polycarbonate | Polyethylene terephthalate | Silicone rubber particles | Flame resistance V test ¹/₁₂ inch bar | Izod impact strength (kg · cm/cm) |
| --- | --- | --- | --- | --- | --- |
| Ex. 13 | 100 | 0 | 5 | V - 0 | 90 |
| Ex. 14 | 90 | 10 | 10 | V - 1 | 60 |
| Com. Ex. 13 | 100 | 0 | 0 | — | 82 |
| Com. Ex. 14 | 90 | 10 | 0 | — | 40 |

EXAMPLE 15

[Preparation of Silicone Rubber-based Graft Copolymer Particles (E-1)]

Using an aqueous emulsion of pH 1.8 obtained in Example 5 prior to neutralization (hereinafter referred to as "aqueous emulsion (C-5H)") which contained polymer particles (C-5) comprising a BA/St copolymer and a silicone rubber and which had a number average particle size of 0.04 μm and a variation coefficient of 32%, an aqueous emulsion (D-1) containing silicone rubber-based graft copolymer particles (E-1) was prepared as follows:

A five-necked flask equipped with a stirrer, a reflux condenser, an inlet for introducing nitrogen gas, an inlet for introducing monomers and a thermometer was charged with the following ingredients.

| Ingredients | Amount (part) |
|---|---|
| Pure water | 240 |
| Aqueous silicone rubber particle-containing Emulsion (C-5H) (solid matter) | 70 |
| SFS | 0.2 |
| EDTA | 0.01 |
| Potassium persulfate | 0.0025 |

The system was maintained at 60° C. with stirring in a nitrogen stream, and a mixture of the following ingredients was continuously added dropwise to the system over 3 hours. After the completion of the dropwise addition, the polymerization was further continued at 60° C. for 1 hour with stirring. After allowing the obtained emulsion to stand at 23° C. for 20 hours, the emulsion was neutralized to pH 8.1 with an aqueous solution of sodium hydroxide to give an aqueous emulsion (D-1) containing silicone rubber-based graft copolymer particles (E-1). The polymerization conversion was 99%, and the obtained emulsion had a solid content of 29%, a number average particle size of 0.05 μm and a variation coefficient of 42%.

In a 200 ml beaker was placed 100 ml of the obtained emulsion (D-1), and it was stirred with a stirring bar to evaluate the viscosity by means of feel. The viscosity was not high and the emulsion was easy to handle.

The emulsion (D-1) was coagulated by adding 2 parts of calcium chloride thereto, dehydrated and dried to give a powder of the graft copolymer particles (E-1). The content of toluene-insoluble matter in the graft copolymer was 90%.

The graft copolymer powder was suitable as an impact modifier and a processing aid for molding materials.

EXAMPLE 16 and 17
and
Comparative Examples 15 to 18
[Preparation of Silicone-modified ABS Resin and Silicone-modified AAS Resin]
(1) Preparation of Silicone Rubber-based Graft Copolymer Particles (E-2) and (E'-1)

Aqueous emulsions (D-2) and (D'-1) containing silicone rubber-based graft copolymer particles (E-2) or (E'-1) were prepared in the same manner as in Example 10 except that in the preparation of the polybutadiene-based graft copolymer emulsion (X-1), the aqueous emulsion (C-1) or (C'-4) was used instead of the polybutadiene emulsion.

(2) Preparation of a Silicone-modified ABS Resin and a Silicone-modified AAS Resin The graft copolymer emulsions (D-2) and (D'-1) were mixed with each of the AN-St copolymer emulsion (Y-1), the polybutadiene-based graft copolymer emulsion (X-1) and the polybutyl acrylate-based graft copolymer emulsion (X-2) which were prepared in Examples 10 and 11 in the proportions (solid basis) shown in Table 8. From the mixed emulsions, silicone-modified and -unmodified ABS resins (ABS-2), (ABS'-3) and (ABS'-4) and silicone-modified and -unmodified AAS resins (AAS-2), (AAS'-3) and (AAS'-4), which had a silicone rubber content of 20% (including silicone rubber), were obtained in the same manner as in Examples 10 and 11.

These modified and unmodified ABS resins and modified and unmodified AAS resins were pelletized in the same manner as in Examples 10 and 11. Using the obtained pellets, ¼ inch Izod impact test specimens and sheet-like molded articles having a size of 150×100×2 mm were prepared and evaluated according to the methods described before.

The results are shown in Table 9.

From Table 9, it is found that resins (ABS-2, AAS-2) obtained by using the silicone rubber-based graft copolymer particles of the present invention exhibit excellent impact resistance, appearance of molded articles, processability and slippability.

TABLE 8

| | Resin | Amount (solid matter) (part) | | | | |
|---|---|---|---|---|---|---|
| | | Y-1 | X-1 | X-2 | D-2 | D'-1 |
| Ex. 16 | ABS-2 | 67 | 26.4 | — | 6.6 | — |
| Ex. 17 | AAS-2 | 67 | — | 26.4 | 6.6 | — |
| Com. Ex. 15 | ABS'-3 | 67 | 33 | — | — | — |
| Com. Ex. 16 | ABS'-4 | 67 | 26.4 | — | — | 6.6 |
| Com. Ex. 17 | AAS'-3 | 67 | — | 33 | — | — |
| Com. Ex. 18 | AAS'-4 | 67 | — | 26.4 | — | 6.6 |

TABLE 9

| | Resin | Izod Impact strength (kg · cm/cm) | Appearance of molded article | Processability (mm) | Coefficient of dynamic friction |
|---|---|---|---|---|---|
| Ex. 16 | ABS-2 | 27 | ○ | 820 | 0.13 |
| Ex. 17 | AAS-2 | 16 | ○ | 780 | 0.18 |
| Com. Ex. 15 | ABS'-3 | 22 | ○ | 760 | 0.23 |
| Com. Ex. 16 | ABS'-4 | 23 | X | 780 | 0.20 |
| Com. Ex. 17 | AAS'-3 | 10 | ○ | 720 | 0.29 |
| Com. Ex. 18 | AAS'-4 | 13 | X | 750 | 0.22 |

EXAMPLE 18
and
Comparative Example 19
[Preparation of Impact Resistant Vinyl Chloride Resin Composition]
(1) Preparation of Silicone Rubber-based Graft Copolymer Particles (E-3)

A five-necked flask equipped with a stirrer, a reflux condenser, an inlet for introducing nitrogen gas, an inlet for introducing monomers and a thermometer was charged with the following ingredients.

| Ingredients | Amount (part) |
| --- | --- |
| Pure water | 240 |
| Aqueous silicone rubber particle containing Emulsion (C-2) (solid matter) | 70 |
| SFS | 0.2 |
| EDTA | 0.01 |
| Potassium persulfate | 0.0025 |

The system was maintained at 45° C. with stirring in a nitrogen stream, and a mixture of the following ingredients was continuously added dropwise to the system over 3 hours. After the completion of the dropwise addition, the polymerization was further continued at 45° C. for 1 hour with stirring to give an aqueous emulsion (D-3) containing silicone rubber-based graft copolymer particles (E-3). The polymerization conversion was 99%, and the obtained emulsion had a solid content of 29%, a number average particle size of 0.01 μm and a variation coefficient of 35%.

The emulsion (D-3) was coagulated by adding 2 parts of calcium chloride thereto, dehydrated and dried to give a powder of the silicone rubber-containing graft copolymer particles (E-3). The content of toluene-insoluble matter in the graft copolymer was 93.8%.

(2) Preparation of Impact Resistant Vinyl Chloride Resin Composition

A mixture of the following ingredients was kneaded by heat rolls of 180° C. for 5 minutes and press-molded at 190° C. for 15 minutes to give Izod impact test specimens of ¼ inch.

| Ingredients | Amount (part) |
| --- | --- |
| Vinyl chloride resin | 100 |
| Graft copolymer particles (E-3) | 2 |
| Acrylic rubber-containing impact modifier | 8 |
| Tin stabilizer | 2.5 |
| Lubricant | 0.5 |
| Filler | 3.0 |
| High molecular processing aid | 2.0 |

(Notes)
Vinyl chloride resin: Kanevinyl S1008 made by Kaneka Corporation
Acrylic rubber-containing impact modifier: Kaneace FM20 made by Kaneka Corporation
Tin stabilize: N-2000E made by Nitto Kasei Kabushiki Kaisha
Lubricant: Haoechst-Wachs E made by Hoechst AG
Filler: R650 Made by Sakai Chemical Industry Co., Ltd
High molecular processing aid: Kaneace PA-20 Made by Kaneka Corporation Using the obtained specimens, the Izod impact strength was measured at 23° C. and 0° C.

The results are shown in Table 10 together with the results of a comparative test wherein the above procedure was repeated except that the acrylic rubber containing impact modifier was used in an amount of 10 parts without using the graft copolymer particles (E-3).

TABLE 10

| | Izod impact strength (kg · cm/cm) | |
| --- | --- | --- |
| | 23° C. | 0° C. |
| Ex. 18 | 76 | 15 |
| Com. Ex. 19 | 28 | 8 |

From Table 10, it is found that the impact resistance is improved by incorporating the silicone rubber-based graft copolymer of the present invention.

EXAMPLES 19 and 20 and

Comparative Examples 20 and 21

Using the graft copolymer particles (E-3) obtained in Example 18, a mixture of the ingredients shown in Table 11 was melt-kneaded by a twin screw extruder (model TEX44SS made by The Japan Steel Works, Ltd.) at 270° C. to give pellets.

The detail of the ingredients shown in Table 11 are as follows:
Polycarbonate: Lexane 141 made by Japan GE Plastics Kabushiki Kaisha
Polybutylene terephthalate: Celanex 1600A made by Hoechst Celanese
Acrylic rubber-containing impact modifier: Kaneace FM20 made by Kaneka Corporation
Phenolic stabilizer: AO-20 made by Asahi Denka Kogyo K.K.
Lubricant: ethylenebisstearylamide

TABLE 11

| Ingredients (part) | Ex. 19 | Ex. 20 | Com. Ex. 20 | Com. Ex. 21 |
| --- | --- | --- | --- | --- |
| Polycarbonate | 80 | — | 80 | — |
| Polybutylene terephthalate | — | 80 | — | 80 |
| Graft copolymer particles (E-3) | 6 | — | 6 | — |
| Acrylic rubber-containing impact modifier | 14 | 20 | 14 | 20 |
| Phenolic stabilizer | 0.2 | 0.2 | 0.2 | 0.2 |
| Lubricant | 0.5 | 0.5 | 0.5 | 0.5 |

The obtained pellets were molded by an injection molding machine (model FAS100B made by Kabushiki Kaisha FUNAC) at a cylinder temperature of 260° C. to give ¼ inch bar Izod impact test specimens.

The Izod impact strength at 23° C. and gloss were evaluated. The results are shown in Table 12.

TABLE 12

| | Izod impact strength (kg · cm/cm) | Gloss |
| --- | --- | --- |
| Ex. 19 | 55 | 97 |
| Ex. 20 | 30 | 95 |
| Com. Ex. 20 | 42 | 92 |
| Com. Ex. 21 | 21 | 91 |

From Table 12, it is found that the impact resistance and gloss of engineering thermoplastic resins are improved by the silicone rubber-based graft copolymer particles of the present invention.

Industrial Applicability

According to the present invention, there can be obtained aqueous silicone rubber particle-containing emulsions which have a narrow particle size distribution and a number average particle size of not more than 0.1 μm and contain a very small amount of an emulsifier as compared with conventional silicone rubber emulsions, and which are suitable as impact modifier, softener, fiber treating agent, hair treating agent, slipping agent, water repellent, processing aid for molding materials, flame retardant and coating material. Also, aqueous silicone rubber-based graft copolymer emulsions comprising silicone rubber-containing polymer particles having a narrow particle size distribution and a number average particle size of not more than 0.1 µm can be obtained by polymerizing a vinyl monomer in the presence of the above aqueous silicone rubber emulsion. Thermoplastic resin compositions incorporated with the silicone rubber particles and/or the silicone rubber-based graft copolymer particles have excellent impact resistance, processability, appearance of molded articles, slippability and flame resistance.

What is claimed:

1. A silicone rubber particle-containing aqueous emulsion which comprises polymer particles comprising (A) 0.1 to 45% by weight of a vinyl homopolymer or copolymer and (B) 55 to 99.9% by weight of a silicone rubber, wherein said polymer particles have a number average particle size of 0.008 to 0.1 µm and a variation coefficient in particle size distribution of at most 65%, and said emulsion contains at most 10 parts by weight of an emulsifier per 100 parts by weight of said silicone rubber (B).

2. The aqueous emulsion of claim 1, which is obtained by adding (b) 60 to 99.9 parts by weight of a silicone rubber-forming component comprising 50 to 100% by weight of a mixture of an organosiloxane and a difunctional silane compound, 0 to 50% by weight of a silane compound having a functionality of at least 3 and 0 to 50% by weight of a polymerizable vinyl group-containing silane compound to an aqueous emulsion containing said vinyl homopolymer or copolymer (A) obtained by emulsion-polymerizing (a) 0.1 to 40 parts by weight of at least one vinyl monomer selected from the group consisting of an aromatic vinyl monomer, a vinyl cyanide monomer, a halogen-containing vinyl monomer, a (meth)acrylic ester monomer, a carboxyl group-containing vinyl monomer and a conjugated diene monomer so that the total amount of said vinyl monomer (a) and said silicone rubber-forming component (b) is 100 parts by weight, and polymerizing said silicone rubber-forming component (b).

3. A silicone rubber particle obtained by coagulating said silicone rubber particle-containing aqueous emulsion of claim 1 or 2, followed by dehydration and drying.

4. An aqueous emulsion containing silicone rubber-based graft copolymer particles, which is prepared by polymerizing a vinyl monomer (c) in the presence of said silicone rubber particle-containing aqueous emulsion of claim 1 or 2.

5. The aqueous emulsion of claim 4, wherein 95 to 5 parts by weight of said vinyl monomer (c) is polymerized in the presence of 5 to 95 parts by weight of the polymer particles included in said silicone rubber particle-containing aqueous emulsion, the total amount of said vinyl monomer (c) and said polymer particles being 100 parts by weight.

6. The aqueous emulsion of claim 4, wherein said vinyl monomer (c) is at least one member selected from the group consisting of an aromatic vinyl monomer, a vinyl cyanide monomer, a halogen-containing vinyl monomer, a (meth) acrylic ester monomer and a carboxyl group-containing vinyl monomer.

7. A silicone rubber-based graft copolymer particle obtained by coagulating said silicone rubber-based graft copolymer particle-containing aqueous emulsion of claim 4, followed by dehydration and drying.

8. A thermoplastic resin composition comprising a thermoplastic resin and 0.1 to 100 parts by weight of said silicone rubber particles of claim 1 or 2 per 100 parts by weight of said thermoplastic resin.

9. A thermoplastic resin composition comprising a thermoplastic resin and 1 to 150 parts by weight of said silicone rubber-based graft copolymer particles of claim 4, per 100 parts by weight of said thermoplastic resin.

10. The composition of claim 8, wherein said thermoplastic resin is at least one member selected from the group consisting of polyvinyl chloride, polystyrene, styrene-acrylonitrile copolymer, styrene-acrylonitrile-N-phenylmaleimide copolymer, α-methylstyrene-acrylonitrile copolymer, polymethyl methacrylate, methyl methacrylate-styrene copolymer, ABS resin, AAS resin, AES resin, polycarobnate, polyamide, polyester, polyphenylene ether, acrylic rubber-containing impact modifier, impact modifier containing acrylic-silicone composite rubber and butadiene rubber-containing impact modifier.

11. A process for preparing the silicone rubber particle-containing aqueous emulsion of claim 1, which comprises adding (b) 60 to 99.9 parts by weight of a silicone rubber-forming component comprising 50 to 100% by weight of a mixture of an organosiloxane and a difunctional silane compound, 0 to 50% by weight of a silane compound having a functionality of at least 3 and 0 to 50% by weight of a polymerizable vinyl group-containing silane compound to an aqueous emulsion containing a vinyl homopolymer or copolymer (A) obtained by emulsion-polymerizing (a) 0.1 to 40 parts by weight of at least one vinyl monomer selected from the group consisting of an aromatic vinyl monomer, a vinyl cyanide monomer, a halogen-containing vinyl monomer, a (meth)acrylic ester monomer, a carboxyl group-containing vinyl monomer and a conjugated diene monomer so that the total amount of said vinyl monomer (a) and said silicone rubber-forming component (b) is 100 parts by weight, and polymerizing said silicone rubber-forming component (b).

* * * * *

UNITED STATES PATENT AND TRADEMARK OFFICE
CERTIFICATE OF CORRECTION

PATENT NO.   : 6,339,127 B1
DATED        : January 15, 2002
INVENTOR(S)  : Miyatake et al.

It is certified that error appears in the above-identified patent and that said Letters Patent is hereby corrected as shown below:

<u>Column 22,</u>
Table 1, "Number average particle size (nm)" should be -- Number average particle size (μm) --

<u>Column 23,</u>
Table 3, "Number average particle size (nm)" should be -- Number average particle size (μm) --

Signed and Sealed this

Twenty-fourth Day of September, 2002

Attest:

JAMES E. ROGAN
*Attesting Officer*                *Director of the United States Patent and Trademark Office*